United States Patent
Levine et al.

(10) Patent No.: US 6,233,566 B1
(45) Date of Patent: May 15, 2001

(54) SYSTEM, METHOD AND COMPUTER PROGRAM PRODUCT FOR ONLINE FINANCIAL PRODUCTS TRADING

(75) Inventors: David A. Levine; Monica L. Levine, both of Sheperdstown, WV (US); Gabriel D. Minton, Keddysville; Jon Poletti, Frederick, both of MD (US); Dean Sondregger, Ashburn, VA (US)

(73) Assignee: Ultraprise Corporation, Dulles, VA (US)

( * ) Notice: Subject to any disclaimer, the term of this patent is extended or adjusted under 35 U.S.C. 154(b) by 0 days.

(21) Appl. No.: 09/270,837

(22) Filed: Mar. 18, 1999

Related U.S. Application Data

(60) Provisional application No. 60/114,578, filed on Dec. 31, 1998.

(51) Int. Cl.[7] .............................. G06F 17/60; G06G 7/52

(52) U.S. Cl. ................................. 705/37; 705/36; 705/38

(58) Field of Search .................................. 705/38, 37, 36, 705/35, 67, 68, 69, 41; 369/918, 918.1, 948.3; 235/379

(56) References Cited

U.S. PATENT DOCUMENTS

| | | | |
|---|---|---|---|
| 4,412,287 | 10/1983 | Braddock, III | 364/408 |
| 4,674,044 | 6/1987 | Kalmus et al. | 364/408 |
| 4,677,552 | 6/1987 | Sibley, Jr. et al. | 364/408 |
| 4,750,119 | 6/1988 | Cohen et al. | 364/401 |
| 4,750,135 | 6/1988 | Boilen | 364/514 |
| 4,774,664 | * 9/1988 | Campbell et al. | 364/408 |
| 4,799,156 | 1/1989 | Shavit et al. | 705/26 |
| 4,851,811 | * 7/1989 | Vallat et al. | 340/326 |
| 4,876,648 | 10/1989 | Lloyd | 364/408 |
| 4,903,201 | 2/1990 | Wagner | 364/408 |

(List continued on next page.)

FOREIGN PATENT DOCUMENTS

| | | | |
|---|---|---|---|
| 0 399 850 | 11/1990 | (EP) | G06F/15/24 |
| 2637845 | * 4/1987 | (FR) | B42D/12/00 |
| WO 94/10637 | 5/1994 | (WO) | G06F/15/21 |
| WO 95/27945 | 10/1995 | (WO) | G06F/15/16 |
| WO 96/05563 | 2/1996 | (WO) | G06F/17/60 |
| WO 97/08640 | 6/1997 | (WO) | G06F/17/60 |
| WO 97/30407 | 8/1997 | (WO) | G06F/17/60 |
| WO 97/43727 | 11/1997 | (WO) | G06F/17/60 |
| WO 97/45802 | 12/1997 | (WO) | G06F/17/60 |
| WO 98/58333 | 12/1998 | (WO) | G06F/17/60 |

OTHER PUBLICATIONS

IMX Exchange; IMX Mortgage Exchange develops secure technology to connect brokers and lenders, Press Release; www.imx–exchange.com/about/press/97_10_01.html, Oct. 1, 1997.*

(List continued on next page.)

Primary Examiner—Eric W. Stamber
Assistant Examiner—Pedro Kanof
(74) Attorney, Agent, or Firm—Sterne, Kessler, Goldstein & Fox P.L.L.C.

(57) ABSTRACT

An online centralized financial products exchange system. The invention is a system, method and computer program product that creates a "marketplace" for end-to-end financial products life cycle transactions. More particularly, the invention provides a centralized exchange system for the trading of loans. The system includes a plurality of Web servers for receiving and providing loan information from and to subscribers on several Web clients and a database server for searching the pre-set rules to match potential buyers with sellers. The system also includes a database for storing information relating to negotiations (i.e., bidding) for the sale of loans and for storing pre-set rules for pre-registered buyers and sellers. The system further includes a database and server for storing risk/return information that is made available to subscribers for analysis.

36 Claims, 30 Drawing Sheets

U.S. PATENT DOCUMENTS

| | | | |
|---|---|---|---|
| 4,953,085 | * 8/1990 | Atkins | 364/408 |
| 5,063,507 | 11/1991 | Lindsey et al. | 364/408 |
| 5,077,665 | 12/1991 | Silverman et al. | 705/37 |
| 5,101,353 | 3/1992 | Lupien et al. | 364/408 |
| 5,103,204 | * 4/1992 | Hartman | 340/332 |
| 5,124,683 | * 6/1992 | Brunner | 340/323 R |
| 5,136,501 | 8/1992 | Silverman et al. | 705/37 |
| 5,239,462 | 8/1993 | Jones et al. | 705/38 |
| 5,274,547 | 12/1993 | Zoffel et al. | 705/39 |
| 5,285,383 | 2/1994 | Lindsey et al. | 364/408 |
| 5,297,031 | 3/1994 | Gutterman et al. | 364/408 |
| 5,297,032 | 3/1994 | Trojan et al. | 364/408 |
| 5,355,115 | * 10/1994 | Goor et al. | 340/321 |
| 5,375,055 | 12/1994 | Togher et al. | 364/408 |
| 5,394,324 | 2/1995 | Clearwater | 364/402 |
| 5,414,838 | 5/1995 | Kolton et al. | 395/600 |
| 5,453,601 | * 9/1995 | Rosen | 235/379 |
| 5,500,793 | 3/1996 | Deming, Jr. et al. | 705/37 |
| 5,508,913 | 4/1996 | Yamamoto et al. | 705/37 |
| 5,560,005 | 9/1996 | Hoover et al. | 707/10 |
| 5,563,783 | 10/1996 | Stolfo et al. | 364/408 |
| 5,584,025 | 12/1996 | Keithley et al. | 707/104 |
| 5,587,704 | * 12/1996 | Foster | 340/573 |
| 5,592,375 | 1/1997 | Salmon et al. | 395/207 |
| 5,594,409 | * 1/1997 | Shank | 340/326 |
| 5,611,052 | 3/1997 | Dykstra et al. | 395/238 |
| 5,631,828 | 5/1997 | Hagan | 395/204 |
| 5,644,726 | 7/1997 | Oppenheimer | 395/238 |
| 5,644,727 | * 7/1997 | Atkins | 395/240 |
| 5,664,115 | 9/1997 | Fraser | 364/401 |
| 5,673,402 | * 9/1997 | Ryan et al. | 395/238 |
| 5,689,650 | * 11/1997 | McClelland et al. | 705/36 |
| 5,732,400 | 3/1998 | Mandler et al. | 705/26 |
| 5,765,141 | 6/1998 | Spector | 705/14 |
| 5,765,144 | 6/1998 | Larche et al. | 705/38 |
| 5,787,402 | 7/1998 | Potter et al. | 705/37 |
| 5,797,133 | 8/1998 | Jones et al. | 705/38 |
| 5,799,151 | 8/1998 | Hoffer | 395/200.34 |
| 5,806,048 | 9/1998 | Kiron et al. | 705/36 |
| 5,809,483 | 9/1998 | Broka et al. | 705/37 |
| 5,812,988 | 9/1998 | Sandretto | 705/36 |
| 5,826,244 | 10/1998 | Huberman | 705/37 |
| 5,852,811 | * 12/1998 | Atkins | 705/36 |
| 5,864,828 | * 6/1999 | Atkins | 705/36 |
| 5,873,071 | 2/1999 | Ferstenberg et al. | 705/37 |
| 5,875,437 | * 2/1999 | Atkins | 705/40 |
| 5,878,403 | 3/1999 | DeFrancesco et al. | 705/38 |
| 5,884,285 | * 3/1999 | Atkins | 705/36 |
| 5,903,879 | 5/1999 | Mitchell | 705/38 |
| 5,905,974 | 5/1999 | Fraser et al. | 705/37 |
| 5,911,135 | * 6/1999 | Atkins | 705/35 |
| 5,911,136 | * 6/1999 | Atkins | 705/36 |
| 5,920,629 | * 7/1999 | Rosen | 380/24 |
| 5,930,776 | 7/1999 | Dykstra et al. | 705/38 |
| 5,940,812 | 8/1999 | Tengel et al. | 705/38 |
| 5,946,667 | * 8/1999 | Tull, Jr. et al. | 705/36 |
| 5,966,699 | 10/1999 | Zandi | 705/38 |
| 5,966,700 | * 10/1999 | Gould et al. | 705/38 |
| 5,978,485 | * 11/1999 | Rosen | 380/49 |
| 5,987,434 | * 11/1999 | Libman | 705/36 |
| 5,991,745 | 11/1999 | Kiritz | 705/38 |
| 5,995,947 | 11/1999 | Fraser et al. | 705/38 |
| 6,006,207 | * 12/1999 | Mumick et al. | 705/38 |
| 6,009,407 | * 12/1999 | Garg | 705/10 |
| 6,012,047 | 1/2000 | Mazonas et al. | 705/38 |
| 6,014,643 | 1/2000 | Minton | 705/37 |
| 6,016,482 | * 6/2000 | Molinari et al. | 705/35 |
| 6,023,686 | 2/2000 | Brown | 705/37 |
| 6,029,146 | 2/2000 | Hawkins et al. | 705/35 |
| 6,029,149 | * 2/2000 | Dykstra et al. | 705/38 |

OTHER PUBLICATIONS

IMX Exchange; Mortgage Technology Magazine; Article; www.imx–exchange.com?about/articles/article10_98.html, Sep. 10, 1998.*

Real.estate.com; MortgageAction.com Launches National Roll–Out of >>>;realestate.com . . ./1999releases/ma.nationalpress.asp, Mar. 7, 2000.*

IMX Heading For The Internet; The Mortgage Marketplace, v21, n71, pN/A, Feb. 16, 1998.*

Scott, Mike;Is E–morgatge ready for takeoff? (online mortgage marketing); Mortgage Banking, V59; n3, Dec. 1, 1998.*

Van Kirk; Smart connections; CFO: The Magazine for Senior Financial Executives; v11; n1; pp. 51–57, Oct. 1, 1997.*

John, G. H. et al., "Mortgage Data Mining" Proceedings of the IEEE/IAFE Conference on Computational Intelligence for Financial Engineering, Mar. 24, 1997 (1997–03–64), XP006078667 abstract, pp. 232–236.

Loanshop.com premiers enhanced web site for online mortgage banking, dated Oct. 5, 1998 found at http://www.mortgage.com/mor/AboutMOR/LoanshopPremier.htm.

LendingTree provides Borrowers Fast and Easy Online Access to Multiple Loan Offers, dated Jun. 23, 1998, found at http://www1.lendingtree.com/new/aboutIt/firstpr.asp.

More Than 300% Expected Increase in Online Holiday Shopping—E–Commerce Sites Need Financing Options for Consumers, dated Nov. 11, 1998, found at http://www1.lendingtree.com/new/aboutIt/holiday2.asp.

LendingTree Announces Turnkey Online Loan–Origination Solution for Lenders, dated Nov. 23, 1998, found at http://www1.Lendingtree.com/new/aboutIt/turnkey.asp.

Internet mortgage service eliminates loan agents and passes commissions on to the consumer, da Jun. 30, 1997, found at http://www.eLoan.com/s/show/press/pr063097.

E–LOAN Adds Second Mortgages To Its Suite of Lending Services, dated Jun. 15, 1998, found at http://www.eLoan-.com/s/show/press/pr061598.

E–LOAN Delivers Mortgage Monitor To My Yahoo! Users, dated Aug. 4, 1998, found at http://www.eLoan.com/s/show/press/pr080498.

First Mortgage Network Rewrites the Mortgage Lending Process with Openclose.com Electronic Network, dated Oct. 22, 1998, found at http://www.mortgage.com/MOR/corp.asp.

IMX Mortgage Exchange Web site, http://www.imx.exchange.com, dated Jan. 26, 1999 (14 pages).

Finance Trader Web site, http://www.financetrader.com, dated May 3, 1999 (1 page).

Bond Network Web site, http://www.bondnetwork.com, dated May 3, 1999 (11 pages).

Reuters, Auction Paging for eBay Users, Business News from Wired News, May 13, 1999, (2 pages).

* cited by examiner

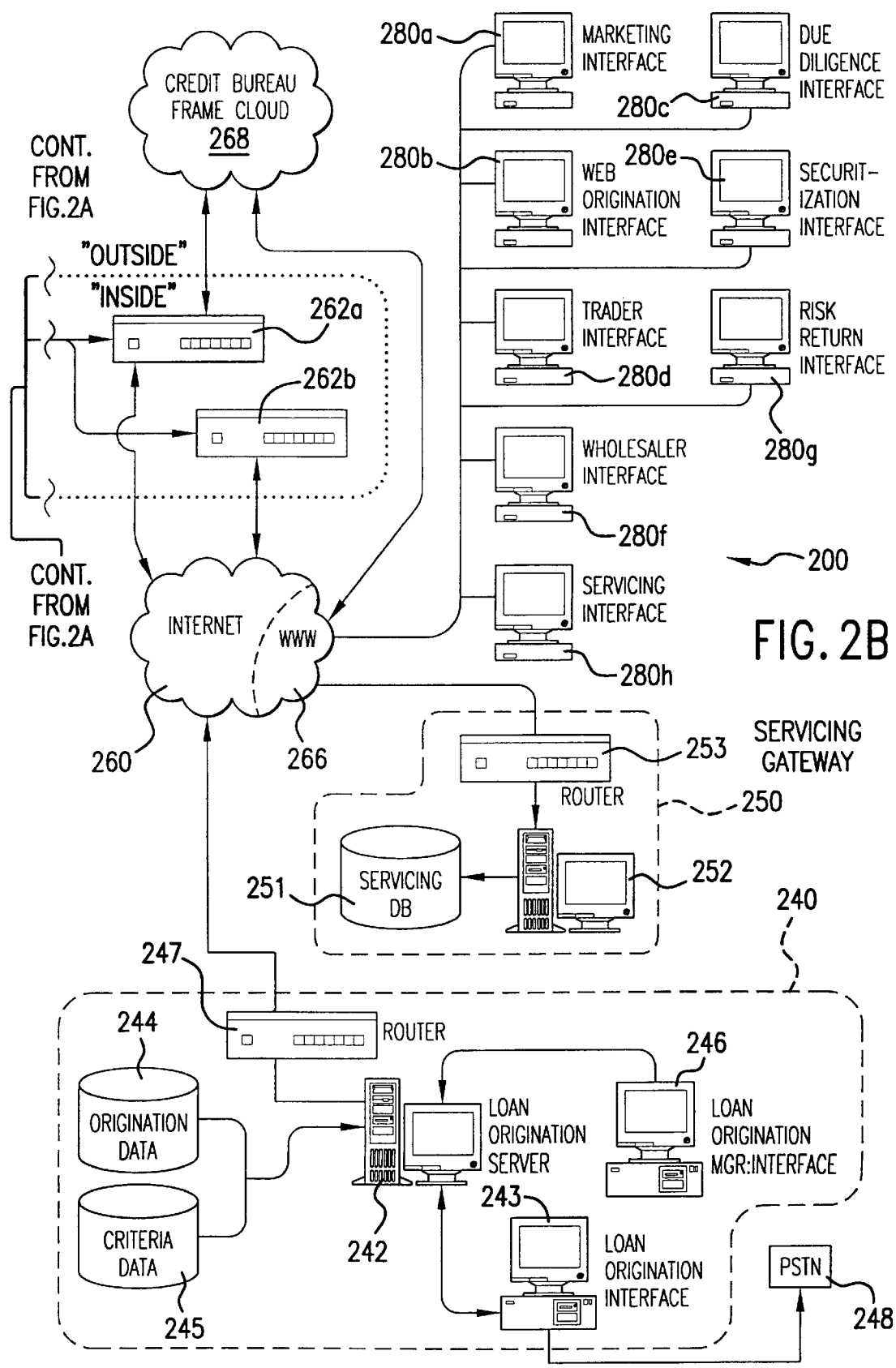

ULTRAPRISE 125

FILE  EDIT  VIEW  SEARCH  WINDOW  HELP  EXIT

TOM SMITH'S
PERSONAL WORK QUEUE

| PRIMARY APPLICANT | LOAN REQUEST | STATUS |
|---|---|---|
| ERIC JONES | 15000.00 | EVALUATING |
| MATT EVANS | 16000.00 | EVALUATING |
| ROBERT CHANCE | 20000.00 | EVALUATING |
| EVAN TINKER | 5000.00 | EVALUATING |
| GREG CARR | 10000.00 | EVALUATING |
| RED DESU | 9000.00 | EVALUATING |
| OBER UDER | 35000.00 | PRE-QUALIFIED |
| JONNIE OBIDIMALOR | 47525.00 | EVALUATING |
| GARY R. DEMANETT | 100000.00 | EVALUATING |
| CHARLIE Q. CREDCO | 90000.00 | EVALUATING |
| DEXTER K. O'BRYANT | 60000.00 | EVALUATING |

LOAN SUMMARY
PRIMARY APPLICANT: DEXTER O'BRYANT

| LOAN NUMBER: | | LOAN STATUS: EVALUATION | ASSIGNED PROCESSOR: |
|---|---|---|---|
| LOAN AMOUNT: | 60000 | PRIMARY FICO: | ASSIGNED UNDERWRITER: |
| APPLICATION DATE: | | APPRAISAL TYPE: | |
| DAYS IN ORIGINATION: | | APPRAISAL DATE: | |

READY    CAPS  NUM  INS  3:11PM  11/19/98

□ ULTRAPRISE 125     _ □ ✕

FILE  EDIT  VIEW  SEARCH  WINDOW  HELP  EXIT

TOOLBAR

DEXTER O'BRYANT    APPLICANT LIST    LOAN STATUS
1234567890    DEXTER O'BRYANT    ▓▓▓▓▓▓
   GREER O'BRYANT    EVALUATING

APPLICATION DATE

| PERSONAL | EMPLOYMENT | PROPERTY | CREDIT REPORT | LOAN | STIPULATIONS |

PROPERTY ADDRESS [15589 DELAWARE DRIVE]     TAXES [ ]
               CITY [KING GEORGE]    INSURANCE COST [ ]
             STATE [VA]    HOA DUES [0]
                 ZIP [22487]    ESTIMATED VALUE [115000]
      PROPERTY TYPE [1 ▽]

1008     1012            [61]

[SUBMIT]

| PROPERTY | LIENS | APPRAISAL |

READY       CAPS   NUM   INS   3:13PM   11/19/98

| ADDRESS: | □ /POOL000001.XLS ▷ | LINKS | □ ULTRAPRISE.COM FRONT PAGE | □ BEST OF THE WEB | □ CHANNEL GUIDE | □ CUSTOMIZE LINKS | □ INTERNET EXPLORER NEWS | □ INTERNET START |

| B94 ▷ | | | | | | | | | | |
|---|---|---|---|---|---|---|---|---|---|---|
| STATUS | LOAN NUMBER | BORROWER NAME | FICO | PURCH. BAL. | TERM | RATE | ORI.BAL. | STATE | TYPE | CLTV | DR |
| ACCEPT ▷ | 9202002886 | COURBET, GUSTAVE | 667 | 30,000 | 180 | 13.75 | 30,000 | VA | SFR | --- | 38.80 |
| ACCEPT ▷ | 9202002887 | COUTURE, THOMAS | 668 | 55,000 | 240 | 12.99 | 55,000 | KY | COND | 124.7 | 34.10 |
| ACCEPT ▷ | 9202002888 | CRANACH, LUCAS THE ELDER | 687 | 31,500 | 180 | 12.99 | 31,500 | NJ | SFR | 106.1 | 47.30 |
| ACCEPT ▷ | 9202002889 | CROPSEY, JASPER | 667 | 37,500 | 300 | 12.75 | 37,500 | MO | SFR | 109.8 | 33.30 |
| ACCEPT ▷ | 9202002890 | DAUMIER, HONOR, | 646 | 45,000 | 180 | 13.99 | 45,000 | MS | SFR | 112.8 | 31.90 |
| ACCEPT ▷ | 9202002891 | DAVID, GERARD | 715 | 45,000 | 240 | 12.75 | 45,000 | NJ | SFR | 117.5 | 41.40 |
| ACCEPT ▷ | 9202002892 | DAVID, JACQUES-LOUIS | 717 | 35,000 | 300 | 12.75 | 35,000 | PA | SFR | 117.7 | 46.50 |
| ACCEPT ▷ | 9202002899 | DAVIS, STUART | 712 | 53,000 | 300 | 11.75 | 53,000 | NJ | SFR | 113.4 | 41.90 |

FIG. 18

| SELLER DATA | |
|---|---|
| PRICING: | 105.5% |
| PRICE: | 3,945,598 |

| SUMMARY DATA | | | | | |
|---|---|---|---|---|---|
| ACCEPTED LOANS | | DECLINED LOANS | | SUSPENDED LOANS | |
| NUMBER OF LOANS: | 91 | NUMBER OF LOANS: | 0 | NUMBER OF LOANS: | 0 |
| PAR VALUE($): | 3,739,903 | PAR VALUE($): | 0 | PAR VALUE($): | 0 |
| WAC: | 12.8 | WAC: | 0.0 | WAC: | 0.0 |
| WA FICO: | 689.5 | WA FICO: | 0.0 | WA FICO: | 0.0 |
| WA CLTV: | 117.7 | WA CLTV: | 0.0 | WA CLTV: | 0.0 |
| WA DR: | 40.0 | WA DR: | 0.0 | WA DR: | 0.0 |

ULTRAPRISE.COM
JOHN Q. BUYER

LOAN DETAIL 2104

| A/D/S STATUS | LOAN NUMBER | BORROWER NAME | FICO | TERM | RATE | ORI.BAL. | STATE | CLTV | DR |
|---|---|---|---|---|---|---|---|---|---|
| ACCEPT ▽ | 9203001987 | PUBLIC, ALVIN Q. | 640 | 300 | 14.99 | 35,000 | OH | 122.2 | 45.00 |

CONDITIONS (REASONS FOR SUSPENSION)

NEW:

(SUBMIT)

BORROWER

| SSN | MONTHLY INCOME | MONTHLY INDIVIDUAL INCOME | FIRST TIME HOME BUYER? | MONTHLY LIABILITIES | DR | YEARS AT JOB | SELF EMPLOYED? |
|---|---|---|---|---|---|---|---|
| 999-29-3952 | 4,431.00 | 2,918.00 | --- | 1,995.02 | 45.00 | --- | --- |

MAILING ADDRESS
4587 EUCLID DRIVE
GALLOWAY, OH 43119-

YEARS AT RESIDENCE
---

HOME PHONE
(614)555-1617

WORK PHONE
(888)555-2745

CONTINUED FROM FIG.21A

| LOAN | | | | |
|---|---|---|---|---|
| PURCHASE BALANCE 35,000 | ORIGINAL BALANCE --- | TERM 300 | REMAINING TERM 300 | RATE 14.99 |
| PURPOSE DBT | MATURITY DATE 9/1/23 | LIEN POSITION 2 | LAST PAID DATA --- | NEXT PAYMENT DATE 10/1/98 |
| PREPAYMENT PENALTY CODE (#OF YEARS) 3 | DEBTS PAID 26,521 | CASH OUT --- | CLTV 122.2 | P+I --- |
| FIRST PAYMENT AMOUNT 953 | FIRST PAYMENT DATE 10/1/98 | NOTE DATE 8/22/98 | CLOSE DATE 9/1/98 | LATE CHARGE GRACE PERIOD 10 |
| CURRENT LATE CHARGES --- | UNPAID LATE CHARGE --- | OTHER LIEN AMOUNT --- | SEC32 --- | DAILY INTEREST LOAN --- |

CONTINUED FROM FIG.21B ⟩ 2104

CREDIT REPORT

| FICO | LIFE HISTORY 30 LATE | LIFE HISTORY 60 LATE | LIFE HISTORY 90+ LATE | NUMBER OF CREDIT REPOS. USED | BANKRUPTCY |
|---|---|---|---|---|---|
| 640 | --- | --- | --- | --- | --- |

PROPERTY

| MAILING ADDRESS | COUNTY | APPRAISED VALUE | APPRAISAL TYPE | TYPE | OWNER OCCUPIED? |
|---|---|---|---|---|---|
| 4587 EUCLID DRIVE GALLOWAY, OH 43119- | --- | 120,000 | --- | SFR | --- |

FIRST MORTGAGE

| BALANCE | ORIGINAL BALANCE |
|---|---|
| 111,675 | 35,000 |

COBORROWER 1

| NAME | FICO | SSN | WORK PHONE | MONTHLY INCOME |
|---|---|---|---|---|
| WILSON, FIONA | 660 | 999-25-2146 | --- | 1,513 |

FIG.21C

ULTRAPRISE.COM

| JOHN Q. BUYER | MY BIDS | POOLS | MEMBERSHIP | CORPORATE SITE |

2204

EVALUATE BY CRITERIA

POOL 12345678 JANE M. SELLER, NATIONAL MORTGAGE INSTITUTION

ACCEPT ALL LOANS THAT FALL WITHIN THE PARAMETERS INDICATED BELOW.
DECLINE THOSE THAT FALL OUTSIDE.*

(CALCULATE)

FICO  ○ ALL  ⊙ SPECIFY: [639] ≤ SCORE ≤ [  ]  ☐ LESS THAN
☑ GREATER THAN

CLTV  ⊙ ALL  ○ SPECIFY: [   ] ≤ VALUE ≤ [  ]  ☑ LESS THAN
☑ GREATER THAN

DEBT RATIO  ⊙ ALL  ○ SPECIFY: [   ] ≤ RATIO ≤ [  ]  ☑ LESS THAN
☑ GREATER THAN

ORIGINAL
ACCEPT        86      $3,485,303
DECLINE        0               0
PAR VALUE             $3,485,303

CURRENT
ACCEPT        82      $3,374,854
DECLINE        4         110,449
PAR VALUE             $3,374,854

(APPLY LOAN TO DISPLAY)

FIG.22

ULTRAPRISE.COM

| JOHN Q. BUYER | BIDS | POOLS | MEMBERSHIPS | | CORPORATE SITE |

MY BIDS
JOHN Q. BUYER
AMERICAN MORTGAGE HOLDING

VIEW: [ONLY MY BUYS ▽]    ⊙ BUY ALERT

⊙ SEARCH FOR POOLS    ⊙ BROWSE ALL POOLS

BUYING

| POOL | PRODUCT | POSTED | SELLER | ASKING | OUR BID | BUYER | A | D | S | OFFERED | BID STATUS |
|---|---|---|---|---|---|---|---|---|---|---|---|
| 2ND HEL | FIXED | 3/12/99 | PETER WILSON, LANGSTON HOME INC. | $20,500,000/102.5 | $18,600,000/98.5 | JQB | 500 | 25 | 10 | 3/13/99 | SELLER COUNTERED |
| 1ST TRUST | ARM | 3/12/99 | SUSAN BOK, NATIONAL LENDING INC. | $405,700,000/99.00 | $388,504,040/97.0 | JQB | 2,025 | 10 | 10 | 3/13/99 | BID OUT |
| 2ND NON EQUITY | FIXED | 3/11/99 | NORMAN FIELD, FTLS MORGAGE INC. | $3,945,598/104.5 | $3,730,900/102.5 | JQB | 80 | 3 | 8 | 3/13/99 | SELLER ACCEPTED |

ALERT: NEW POOLS HAVE BEEN POSTED THAT MATCH YOUR UNDERWRITING CRITERIA VIEW

CLOSED

| POOL | SELLER | ASKING | SOLD | BUYER | DON'T SHOW AGAIN |
|---|---|---|---|---|---|
| 6893854048 | JANE M. SELLER, NATIONAL MORTGAGE INSTITUTION | $350,000,000/99.1 | $340,000,000/98.0 | KEVIN ANDERSON, ACME MORTGAGE BANK | ☑ |
| 1983781293 | NORMAN FIELD, FTLS MORTGAGE INC. | $500,000,000/102.7 | $495,000,000/102.5 | MICHAEL BROWN, ALLIED BANK | ☑ |
| 1908381930 | ANTHONY NUBER, KENDREN HOLDINGS | $350,000,000 | WITHDRAWN | N/A | ☑ |

(REMOVE)

FIG. 24

SYSTEM, METHOD AND COMPUTER PROGRAM PRODUCT FOR ONLINE FINANCIAL PRODUCTS TRADING

CROSS-REFERENCE TO RELATED APPLICATIONS

This application claims the benefit of Appl. Ser. No. 60/114,578, filed Dec. 31, 1998.

BACKGROUND OF THE INVENTION

1. Field of the Invention

The present invention relates generally to a centralized exchange system for creating a marketplace to buy and sell financial products, and more particularly to a centralized exchange system for the trading loans.

2. Related Art

Over the past several years, there has been an explosion of computers, and thus people, connected to the global Internet and the World-Wide Web (WWW). This increase of connectivity has allowed computer users to access various types of information, disseminate information, and be exposed to electronic commerce activities, all with a great degree of freedom. Electronic commerce includes large corporations, small businesses, individual entrepreneurs, organizations, and the like, who offer their information, products, and/or services to people all over the world via the Internet.

Financial products are one of the types of products available through electronic commerce activities. Consumer loan products, one example of financial products available through electronic commerce, are typically divided into two categories—conforming (or conventional) loans and non-conforming (or non-conventional) loans. Conforming loans are low risk loans and include traditional primary residence mortgage loans to consumers with good credit histories and loans to consumers who qualify under certain government-backed loan programs (e.g., Federal Housing Administration (FHA) or the Veterans Administration (VA)).

In contrast to conforming loans, non-conforming loans pose a higher risk for lenders than conforming loans. Non-conforming loans include loans to consumers with bad credit (e.g., due to bankruptcy or foreclosure), non-income verification loans (e.g., loans to consumers who have been self-employed for less than 2 years), loans for non-owner occupied properties, loans for non-conventional properties, some commercial (business) loans, and High-Loan-To-Value (HLTV) loans.

For example, HLTV loans are typically obtained by consumers, who by using equity in their homes as collateral, consolidate other (e.g., credit card) debt. These types of loans involve a lender who loans a consumer an amount of money in excess of 100% of the consumer's equity in their home. For example, an "HLTV 125" loan refers to consumer who obtains a loan for 125% of the value of their home.

In more detail, an "HTLV 125" loan would work as follows. A consumer who owns a home valued at $100,000, and has a first mortgage on that home for 80% of the value (i.e., $80,000), would have $20,000 in equity. If the consumer has credit card debts and wanted to borrow money to consolidate these debts, a lender may offer the consumer an HLTV loan. In one scenario, the consumer may be able to obtain a loan for the $20,000 equity in their home, and borrow against an additional 25% of the value of the home (i.e., another $25,000) for a total loan of $45,000. As such, there would now be loans covering 125% of the value of the consumer's home.

Under the current tax laws, this type of loan provides the consumer (i.e., borrower) with a tax advantage because a certain amount of the interest paid on this loan can be deducted on the borrower's income tax returns. In contrast, any interest paid on credit card debt cannot be deducted. Further, the interest rate that a borrower may be able to obtain for an HLTV loan is often less than the interest rate charged by most credit card companies. Thus, consolidating by obtaining an HTLV loan, lowers the borrower's monthly payments and allows the borrower to repay debts owed more quickly. As such, these types of loans are often attractive to consumers.

Non-conforming loans generally are also attractive to lenders because the market will often allow lenders to charge a higher interest rate than on a conventional first mortgage loan (although this interests rate is still lower than that charged by credit card companies). Because lenders are offering the borrower a loan for more than the value of the collateral (e.g., the borrower's home), however, there is a certain amount of risk involved in making such loans. As such, lenders have developed certain rules (based on criteria, such as underwriting criteria) to minimize their risks (i.e., exposure) when making non-conforming loans.

An example criteria used by lenders include identifying potential borrowers in a certain income bracket. This income bracket must be high enough so that there is small likelihood of default, but not so high that the borrower is likely to prepay the loan—thereby decreasing the amount of interest collected by the lender over the life of the loan.

Another criteria often considered by lenders making non-conforming loans is the borrower's credit rating. A consumer's credit rating is an indication of their ability to pay outstanding debts. Credit rating companies, such as Trans Union Corporation of Chicago, Ill., Experian, Inc. (formerly TRW) of Orange, Calif., and Equifax, Inc. of Atlanta, Ga., collect certain information on individual consumers and assign each a credit rating based on this information.

One method of obtaining a credit rating is known as a "FICO score" which is based on a mathematical model developed by Fair, Isaac, and Company, Inc. of San Rafael, Calif. A FICO score is based on many factors including how a consumer pays their bills, outstanding debt, how long a consumer has had credit, types of credit a consumer has, and how many times a consumer has recently applied for or opened new lines of credit.

Non-conforming loans are typically made to people with relative high FICO scores, known as "A" borrowers. "A" borrowers usually either have some equity in their homes but have a large amount of debt, or they have little or no equity in their homes. "A" borrowers have credit ratings which indicate that they will be able to repay a loan.

Loans can also be extended to "sub-prime" borrowers—individuals with "B" or "C" credit ratings. These subprime borrowers have relatively lower credit scores. Loans in this case may be the borrower's first mortgage on a home, e.g., for which the borrower has a risky credit rating, but they have collateral, such as a home, which has not been previously mortgaged. Similarly, loans can also be extended to borrowers who are seeking a "jumbo" loan—a loan of $225,000 or more.

All of these types of loans, because of the various risks associated with each, command a higher interest rate than conventional loans.

Referring to FIG. 1, a time line of a typical loan life cycle 100 is shown. The first phase in the loan life cycle 100 is a marketing phase 104. In marketing phase 104, marketing companies target certain potential borrowers to receive advertisements offering loans. For example, potential borrowers may be targeted by geographic region (e.g., by zip code or area code). This advertising can be distributed through many sources, such as via telephone advertising campaigns, via mass mailings, or via the Internet.

The second phase in the loan life cycle 100 is a loan origination phase 108. In loan origination phase 108, the potential borrower contacts the lender (e.g., mortgage bank), or a broker working with a lender, by phone or electronic mail, to request a loan. Usually, this first contact between the potential borrower and the lender is telephonic, as call centers are typically set up to handle responses to the advertising campaigns. After being switched away from the call intake portion of the call center, certain information is collected from the consumer by a loan agent. The loan agent also works with the potential borrower to agree on a loan amount, interest, points, duration or term of the loan and other features of the loan. The loan agent then sends this information to a loan processor and a loan underwriter for approval. The loan processor processes the paperwork necessary for completing the loan and the underwriter makes sure the underwriting guidelines are met, and validates the interest rate and points assigned by the loan agent. If these validated terms are acceptable to both the lender and borrower, the loan is approved, and the loan agent then works with the loan closer to finalize the loan, issue a check, and forward it to the borrower.

The loan may then enter a third phase, known as a loan wholesaling phase 112. Once the lender has made the loan, they often try to sell the loan to a mortgage banker. Alternatively, a loan may be transferred within a company to a different department that handles the wholesaling of loans. Lenders may flow loans to mortgage bankers (i.e., pass a single loan at a time), or bulk loans to mortgage bankers (i.e., pass several loans referred to as a "pool" of loans). The mortgage banker then separately pools the purchased loans and advertises the loan pools to look for investors. The role of the mortgage banker is to buy loans from the loan origination organization (e.g., mortgage bank) or lender, and then pool them in such a way to make them attractive to investors. Mortgage bankers have also developed rules that they use to decide which loans to purchase and how to pool them for sale. These rules are based on many of the same criteria used by the lender in determining whether to originate a loan to the borrower. Similarly, loan origination organizations or lenders consider the rules of the mortgage bankers when making loans, so that their loans look attractive to the mortgage bankers.

The mortgage banker pools the loans and advertises to investors who may be interested in purchasing a pool of loans. For example, a typical pool may consist of 300 loans with an estimated total value of $30 million or may consist of 3000 loans with an estimated total value of $300 million. The potential investor, typically a bank, securitization company or another mortgage banker, will review the information for each loan in the pool and either accept, decline, or reserve its decision for each loan in the pool. Then, the investor may send a revised pool back to the mortgage banker with an offering price to buy the revised pool. The mortgage banker then may add other loans to the pool and resend the pool to the investor for review. This negotiation (or bidding) continues until a sale is made or rejected. The rejected loans may be used already in other pools or may be used directly for securitization, as discussed below.

Once an investor purchases or otherwise acquires a pool of loans, the loans may enter a fourth phase, referred to as a securitization phase 116. In securitization phase 116, the investor groups several pools of loans together into a larger pool, and uses them collectively as collateral to back securities (i.e., mortgage-backed securities such as bonds). These larger pools can then be offered for sale to buyers on the secondary market. Typically, these groups of loan pools are valued in the range of $50 million–$1 billion. Because the company that purchases the loan pools and uses them to back securities is personally responsible, there is a great deal of risk involved in these type of transactions.

Naturally, investors of the loan pools have developed certain rules for evaluating the suitability of the loans for securitization. However, the mortgage bankers' rules used for grouping certain loans together in a pool may be different from the rules used by the investor in deciding which loans it would like to purchase in a pool and the rules used buy lenders in making the underlying loans in the first place. For example, the mortgage banker in an attempt to sell the low risk and high risk loans together, may want to group together loans made to borrowers with high FICO scores with loans made to borrowers with lower FICO scores. However, the investor may have rules which do not allow the purchase of any pool with a loan made to a borrower having a FICO score less than a predetermined amount. As a result, negotiations between the mortgage banker and the investor must occur in order to decide on a pool and a price that is suitable to both parties. It is important to note that although the rules are devised as guidelines for buying and selling loans, these rules may be disregarded or altered on a case-by-case basis. Further, each entity described above may frequently change its rules based on market conditions and other relevant factors.

The process for selling loans or loan pools and then negotiating about the sale is currently ad hoc. Generally, an investor will learn about a pool by calling a particular seller to see what loans or loan pools are available. The seller will then send the investor information about the loan or loan pool generally on a spreadsheet, such as Microsoft® Excel. The investor may reconfigure the information into their preferred format on the spreadsheet, delete or mark those loans from the pool that they do not wish to purchase, and send the spreadsheet with the revised pool back to the seller. This process is often clumsy and inefficient, requiring a lot of manual data re-entry between the parties.

Further, there is no mechanism, apart from person-to-person (e.g., face-to-face or over the telephone) interaction, for determining what loans or pools are for sale, what rules are being used to pool the loans, and what rules are being used by the investors to determine whether to buy certain loans.

The investors service the loans, either themselves or through a separate servicing firm, and create a mortgage-backed security based on the assets (i.e., future income stream) of the pooled loans. The mortgage-backed security has an assigned interest rate based on the future capital of the pools of loans that are being securitized. The mortgage-backed securities are then generally sold, either directly or through brokerage companies, to buyers in the open market.

The mortgage-backed securities are always securitized by the pool of loans, so that the loans can never be transferred again throughout the remainder of their life cycle 100. Prepayment of loans is a problem, because if a loan is prepaid the mortgage-backed security is no longer backed by all of its original underlying assets. Companies that securitize these loans have attempted to predict the amount of prepayment of loans in the pools and work this figure into a yield, however many companies have failed because they could not accurately predict the rate of prepayment or default. There are no metrics on which these investors can base a prediction of rates of pre-payment, or also default or delinquency.

The loan also follows a separate track with the consumer, concurrently with the first track described above. As shown in FIG. 1, once the loan is approved and the money is sent to the borrower, the loan enters a servicing phase 120. Servicing phase 120 consists of a servicing company sending a coupon book to the borrower which indicates when monthly payments are due and the amount of the payment. If the borrower is late on a payment, the servicer will contact the borrower to discuss the missed or late payment. This servicing is very methodical, in that servicing companies will often have pre-set time period for certain actions. Such as, placing a telephone call to a delinquent borrower after his payment is 10 days late, and writing a letter to the delinquent borrower after his payment is 30 days late, and so on.

If the borrower becomes insolvent or delinquent in their payments, the loan enters the next phase, referred to as a claims phase 124. In claims phase 124 the servicing company may enter a claim against the borrower in a bankruptcy proceeding, or file a lawsuit in court to foreclose on the mortgaged property or secure an order to garnish the borrower's wages. Because non-conforming loans are often second mortgages and are typically made for more than the value of the underlying collateral, lenders are reluctant to enter this phase, because it generally results in the lender losing money. In particular, when a non-conforming loan is used to back a security, and the borrower defaults on the loan, the collateral used to back the security disappears. This has, in the past, lead to the demise of many of these types of securitization companies that back securities with non-conforming loan pools.

On both tracks, the loan then enters a final phase, referred to as a loan termination phase 128. Generally the loan enters loan termination phase 128 when the fixed term of the loan expires (e.g., a 30 year fixed loan) and/or the loan has been fully paid (i.e., prepayment).

Therefore, in view of the above, what is needed is a system, method and computer program product for an online (i.e., Internet, intranet, or extranet) system for buying and selling financial products. Such a system would create a "marketplace" in which investors (i.e., buyers) and sellers of these financial products could go to place their products for sale, to ascertain what financial products are for sale, and to determine what the price is in the "marketplace" for certain types of products. Further, what is needed is a system, method and computer program product that archives all of the selection and pricing information for access by its users.

SUMMARY OF THE INVENTION

The present invention is a system, method, and computer program product for the online trading of financial products that meets the needs identified above. In particular, the present invention provides a centralized "marketplace" for trading of loan products and for end-to-end loan handling, i.e., over the lifetime of a loan. As such, the present invention provides a resource for archived information for subscribers (e.g., marketing companies, lenders, mortgage bankers, investors, brokerage companies, etc.). In this way, every individual involved in the financial products industry can access information stored in the centralized "marketplace" system of the present invention to aid in completing transactions relating to the financial products.

One advantage of the present invention is that it provides a centralized "marketplace" for trading in certain types of financial products.

Another advantage of the present invention is that it reduces the amount of manual re-entry of data when negotiating for the sale of a financial product, such as a loan or loan pool. Furthermore, all data, including data relating to the financial product and trading data, are archived to allow for risk management analysis.

Another advantage of the present invention is that it archives information about the financial products and bidding information to be used to determine a market price for the financial products.

Another advantage of the present invention is that it archives rules which are pre-set by investors, so that the right types of loans are originated, thereby creating an efficiency in loan origination and resale.

Further features and advantages of the invention as well as the structure and operation of various embodiments of the present invention are described in detail below with reference to the accompanying drawings.

BRIEF DESCRIPTION OF THE FIGURES

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

FIGS. 2A and 2B are block diagram illustrating the system architecture of an embodiment of the present invention, showing network connectivity among the various components;

FIGS. 7–14 are exemplary graphical user interfaces according to an embodiment of the present invention;

FGS. 18 and 19 are exemplary graphical user interfaces according to an embodiment of the present invention.

FIGS. 21A–21C and 22–24 are exemplary graphical user interfaces to enable a subscriber to engage in trading according to an embodiment of the present invention.

DETAILED DESCRIPTION OF THE PREFERRED EMBODIMENTS

Table of Contents

Figure 1:
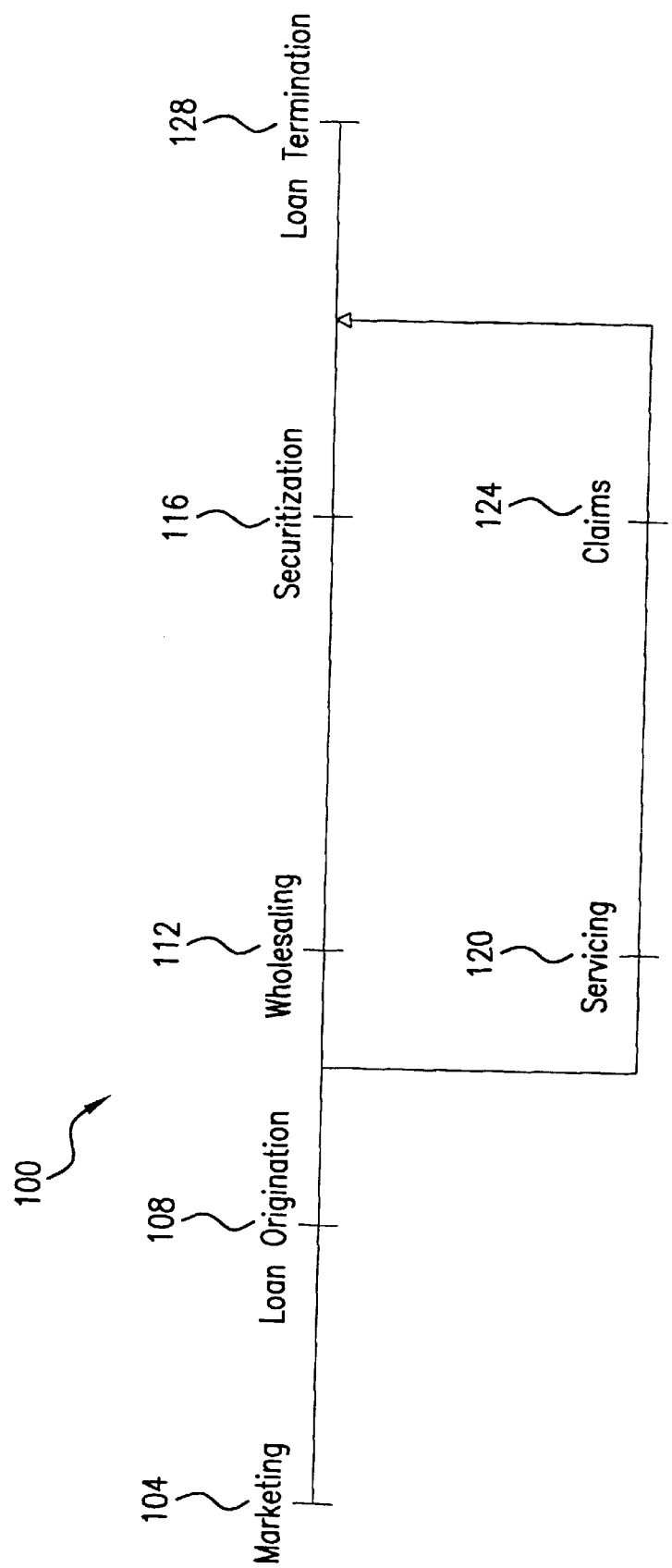
FIG. 1 is a time line showing the typical life cycle of a loan.

I. Overview
II. Criteria for Evaluating a Loan
III. System Architecture
IV. Secure System Interfaces
V. Software/Hardware Architecture
VI. System Operation
  A. Marketing
  B. Loan Origination
  C. Exchange System
  D. Trust (Due Diligence)
  E. Servicing
  F. Securitization
  G. Brokerage
  H. Credit Rating
  I. Risk/Return
VII. Environment
VIII. Conclusion

I. Overview

The present invention relates to a system, method, and computer program product for analyzing, valuating, buying and selling financial products, such as loans. The loans contemplated for use with the present invention include, for example, conforming and non-conforming loans, such as residential mortgage loans, multi-family mortgage loans, commercial mortgage loans, consumer and commercial installment loans, small business loans, student loans and vehicle/boat/plane loans. Although the embodiment described herein relates specifically to loans, it would be apparent to one skilled in the relevant art(s) that the present invention could also be used for analyzing, valuating, buying and selling a variety of other financial products, including, for example: (1) revolving lines of credit, such as credit card accounts and home equity lines of credit, (2) annuities, (3) insurance products, and (4) consumer and commercial assets, such as certificates of deposit.

In an embodiment of the present invention, an organization provides a centralized exchange system for loans. Subscribers to the system (i.e., borrowers, brokers, correspondents, mortgage bankers, servicing companies, investors, capital markets brokers, etc.) may engage in trading that optimizes the types of loans being originated by lowering the risk associated with loan origination and maximizes return on each loan.

The centralized exchange system of the present invention creates a marketplace for trading in financial products, such as loan products. What is meant by marketplace, is a central service that each entity in the above-described loan life cycle can use for handling of loans. This type of system is referred to as an "end-to-end" system, because it is developed for each entity from the beginning to the end of the loan life cycle 100.

Some of the features provided by the system of the present invention include loan origination, loan pooling, publishing loans and loan pools for sale, and negotiating for sale of loans or loan pools. Further, the centralized exchange system provides connection to certain service providers for automatic institution of due diligence investigations and/or loan servicing. Still further, the centralized exchange system archives trading data, servicing data and other loan data to provide risk-return information based on certain criteria (e.g., future loan value index, pricing model, and historical valuation data). Still further, the centralized exchange system stores subscribers' trading rules and can notify a subscriber when loan products complying with its rules are published. The centralized exchange system may also notify subscribers (e.g, by electronic mail, pager, telephone, cellular telephone, personal digital assistant, etc.) when an offer for a loan or loan pool has been made and/or when an offer has been accepted or rejected.

Such a system could allow industry participants such as borrowers, brokers, correspondents, mortgage bankers, servicing companies, investors, and capital markets brokers to intelligently originate and trade in loans not only to hedge against risks, but also to speculate for profit.

The centralized exchange system provider organization supplies an infrastructure, secure protocol, and facilities so that subscribers may utilize the network to address their trading needs. As detailed above with reference to FIG. 1, the present invention addresses the trading needs of the subscribers summarized in Table 1 below. The subscriber names presented in Table 1 are given by way of example, and, as will be apparent to one skilled in the relevant art(s), may vary according to industry custom.

TABLE 1

| SUBSCRIBER | DESCRIPTION (PHASE OF LIFE CYCLE 100) |
| --- | --- |
| Marketing Company | Entities that advertise lenders' financial products to Consumers (phase 104). |
| Borrower/Consumer | Person (homeowner) who desires to obtain a loan (phases 104, 108, 120, and 128). |
| Broker | Individuals hired on an agent basis who bring together borrowers and lenders (phase 108). |
| Mortgage Bank Correspondent | Banks or other lending entities that market and originate loans directly to consumers. They typically then sell the individual loans or loan pools (phases 104–108). |
| Servicing Company | Entities that, on behalf of owner of the loan, monitor and collect monthly payments from the Borrower, and may institute proceedings against borrower who are delinquent or in default (phases 120–124). |
| Mortgage Banker | Entities that purchase loans(in flow or in bulk) from different Lenders and then separately pool them together for resale (phase 112). |
| Investor | Entities that purchase loan pools from wholesalers and group the pools together to create mortgage-backed securities (i.e., securitization), which are then typically sold in the secondary market (phases 116). |
| Capital Markets Broker/Brokerage Company | Entities that act on an agent basis to bring together Investors and Buyers (phase 116) |
| Securities Credit Rating Agency | Entities that, typically on behalf of brokerage companies, rate (i.e., determine overcapitalization) the mortgage-backed securities created by Investors (phase 116). |
| Buyer | Individuals or Entities that purchase (and trade) mortgage-backed securities (phase 116). |

Each subscriber of the centralized exchange system supplies the system with information about its trade activities with each of the other subscribers on the system. The centralized exchange system uses this information along with market data in several ways as will be described below.

The present invention is described in terms of the above example. This is for convenience only and is not intended to limit the application of the present invention. In fact, after reading the following description, it will be apparent to one skilled in the relevant art(s) how to implement the following invention in alternative embodiments (e.g., other types of loans and other financial products).

The terms "subscriber," "user," "person," "buyer," and "seller" are used interchangeably throughout herein to refer to those who would access and use the exchange system of the present invention.

II. Criteria for Evaluating a Loan

The embodiment of the present invention discussed herein relates to the trading of loans, and, thus, relates to the valuation of the loans and loan pools. In the relevant art(s), certain criteria are commonly used for the valuation of loans. In an embodiment of the present invention, subscribers can pre-set, store, and update the rules, based on these criteria, in order to determine which loans or loan packages to purchase. Examples of these loan valuation criteria are provided in Table 2 below.

TABLE 2

LOAN VALUATION CRITERIA

Loan Amount
FICO
Appraisal Value of Property
Total Monthly Income
Term of Loan
Type of Loan
Interest Rate
Points
Loan/Value Ratio
Income/Debt Ratio
Purchase Balance
Original Balance
State
Section 32

As will be apparent to one skilled in the relevant art(s), many other criteria may exist in which subscribers may wish to base their purchase rules.

An example of a pre-set rule that a buyer may use is if the buyer wants to purchase only those loans with an interest rate of 13% or greater and a loan/value ratio of 115 or less. Different buyer companies create their own rules, according to their business model, that they use to minimize risks associated with purchasing loans. These rules can be pre-set in the exchange system of the present invention. Further, the buyer companies can access historical loan data via the system of the present invention to develop new rules to further assist in minimizing risk.

Any two parties can monitor each others' rules in order to originate or acquire loans or loan pools that will be easy to sell and that will command a higher price.

III. System Architecture

Figure 2A:
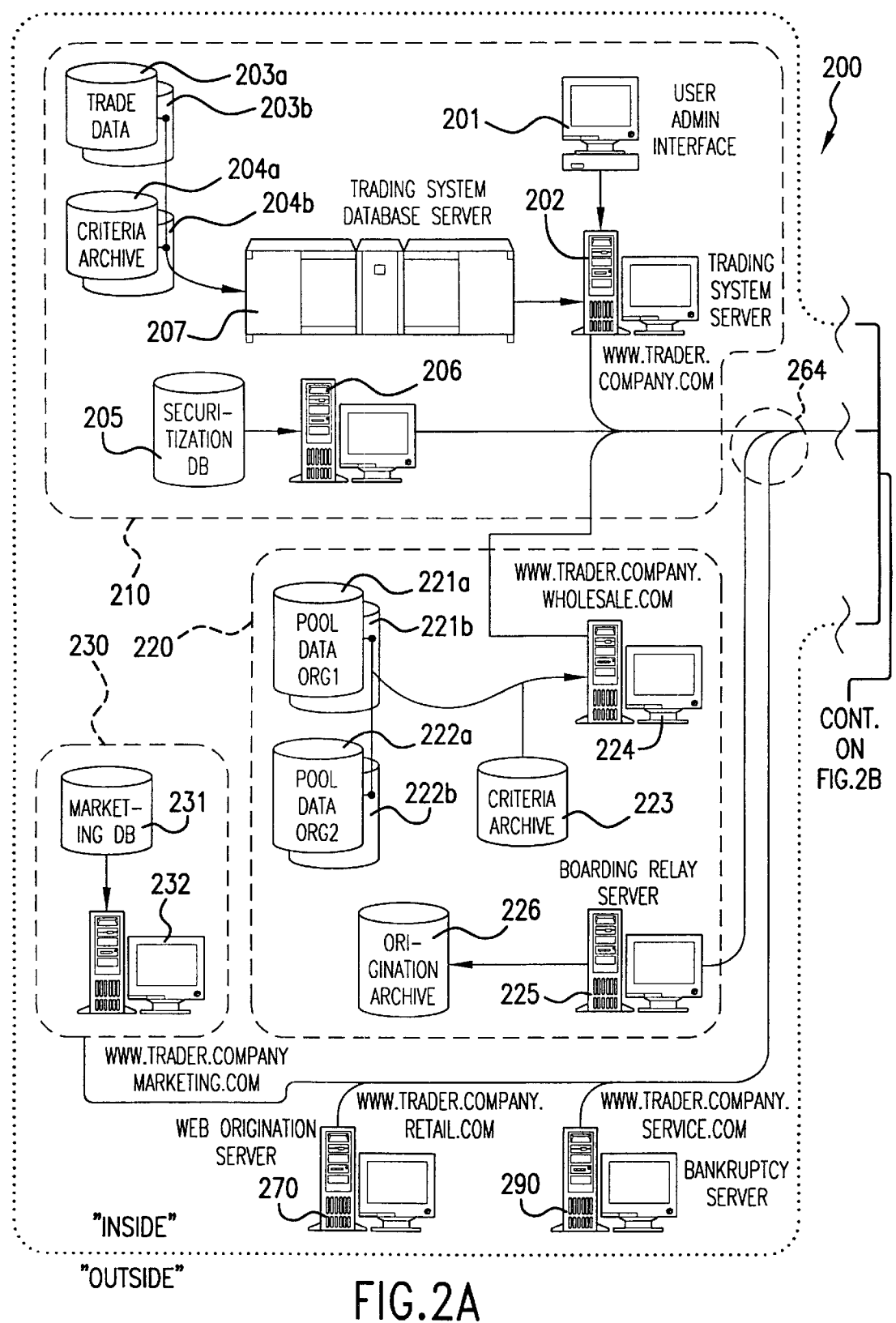

Referring to FIGS. 2A and 2B, a block diagram illustrating the physical architecture of a centralized exchange system 200, according to an embodiment of the present invention, showing network connectivity among the various components, is shown. It should be understood that the particular centralized exchange system 200 shown in FIGS. 2A and 2B is for illustrative purposes only and does not limit the invention.

The components of the exchange system 200, as shown in FIGS. 2A and 2B, are divided into two regions—"inside" and "outside." The components appearing in the inside region refer to those components that the exchange system provider organization would preferably have as part of their infrastructure in order to create the market for online trading of financial products and provide the services contemplated by the present invention. As will be apparent to one skilled in the relevant art(s), all of components "inside" of the centralized exchange system 200 are connected and communicate via a wide or local area network (WAN or LAN 264) running a secure communications protocol (e.g., secure sockets layer (SSL)).

In contrast, the components appearing in the outside region refer to the infrastructure that the subscribers to the exchange system 200 would obtain or already have in place in order to participate in the exchange system 200. In this embodiment, the inside components and the outside components are connected via a secure exchange through the global Internet 260 which includes the WWW 266. In one embodiment, the connection to the Internet 260 is through a router. In this embodiment, the router may be replicated ("mirrored") for fault tolerance, as shown in FIG. 2B as routers 262$a$ and 262$b$. As is well-known in the relevant art(s), routers, available from vendors such as Cisco Systems, Inc. of San Jose, Calif., forward packets between networks.

The exchange system 200 includes a trading subsystem 210. The trading subsystem 210 serves as the "back-bone" (i.e., trading processing system) of the present invention. The trading subsystem 210 includes a exchange system server 202 and a exchange system database server 207. The trading server 202 provides the "front-end" for the trading subsystem 210. Server 202 is a typical Web server process running at a Web site which sends out web pages in response to Hypertext Transfer Protocol (HTTP) requests from remote browsers (i.e., certain subscribers of the exchange system 200). That is, the server 202 provides the graphical user interface (GUI) to certain users of the exchange system 200 in the form of Web pages. In an embodiment of the present invention, the server 202 may be implemented using a Windows NT™ server platform, and database server 207 may be a Sun SPARC station platform running the Solaris operating system.

The exchange system database server 207 includes a trade database and a trading criteria archive. In an embodiment of the present invention, these two databases are mirrored for fault tolerance and thus shown as databases 203$a$ and 203$b$ and archives 204$a$ and 204$b$. The trading subsystem 210 also includes a securitization server 206 connected to a securitization database 205.

The trading subsystem 210 also includes an administrative workstation 201 (e.g., an IBM™ or compatible PC workstation running the Microsoft® Windows 95/98™ or Windows NT™ operating system) that may be used by the trading organization to update, maintain, monitor, and log statistics related to the server 202 and the exchange system 200 in general (e.g., check cards, network connections, software, hardware, etc.).

The exchange system 200 also includes a portfolio subsystem 220. The portfolio subsystem includes a portfolio server 224 that provides a GUI to certain users of the exchange system 200 in the form of Web pages. The portfolio server 224 is connected to one or more organization pool databases. In an embodiment of the present invention, there is an organization pool database that stores data for each organization that subscribes and posts pools to the exchange system 200. For example, FIG. 2A shows an organization 1 pool database and an organization 2 pool database. Both of these databases are mirrored for fault tolerance and thus shown as pool databases 221$a$ and 221$b$ and 222$a$ and 222$b$, respectively. The portfolio server 224 is also connected to a wholesaling criteria archive 223.

The wholesaling subsystem 220 also includes a boarding relay server 225 which is connected to an origination archive 226. The relay server 225 allows data from the origination subsystem 240 (described below) to be collected and archived into the origination archive 226. This allows loan data to be immediately accessed by other subscribers of the system 200 (e.g., the servicing subsystem 250).

The exchange system 200 also includes a marketing subsystem 230. The marketing subsystem 230 includes a marketing database 231 connected to a marketing server 232 that provides a GUI to certain users of the exchange system 200.

The exchange system 200 also includes a origination server 270 and a bankruptcy server 290 that each provide a GUI to certain users of the exchange system 200. These two servers complete the inside region of the exchange system 200.

Within the outside region of exchange system 200 is a loan origination subsystem 240. While one loan origination subsystem 240 is shown in FIG. 2B, it will be apparent to one skilled in the relevant art(s) that a plurality of loan originating entities, each with their own loan origination subsystem 240 infrastructure, may subscribe to the exchange system 200 and thus access the above-described components inside of the system.

The loan origination subsystem 240 includes a loan origination interface 243 workstation. In an embodiment of the present invention, a consumer (i.e., borrower) would call into the subsystem 240 via the public service telephone network (PSTN) 248 to apply for a loan. A customer service agent, working for the loan originating entity would gather the information using a GUI on the interface workstation 243. Again, while one origination workstation 243 is shown in FIG. 2B, it will be apparent to one skilled in the relevant art(s) that a loan origination entity will employ a plurality of customer service agents within a call center, thus necessitating a plurality of workstations 243. The workstation 243 is connected to a loan origination server 242. Server 242 provides the back-end processing of the loan origination subsystem 240. The server 242 is connected to an origination database 244 and a criteria database 245. The loan origination subsystem 240 also includes a manager workstation 246 which allows the manager of the loan origination entity to manipulate the data in the criteria database 245 and perform supervisory functions over the customer service agents using the workstations 243. The loan origination subsystem 240 also includes a router 247—similar in functionality as routers 262a and 262b described above-which allows origination data to be securely uploaded to the inside of the exchange system 200 via the Internet 260.

During the loan origination process, the loan origination subsystem 240, via router 247 and the Internet 260, may obtain credit history data from a credit service bureau represented by a frame cloud 268.

The outside region of exchange system 200 also includes a servicing subsystem 250. The servicing subsystem 250 includes a servicing server 252 connected to a servicing database 251. Many servicing companies utilize mortgage service software such as the Mortgage Servicer Systems software available from Financial Industry Computer Systems (FICS) Group of Brussels, Belgium. Thus, the servicing database 251 would contain FICS data which would interface with the exchange system 200 via a router 253—similar in functionality as routers 262a, 262b and 247 described above—and the Internet 260.

While one servicing subsystem 250 is shown in FIG. 2B, it will be apparent to one skilled in the relevant art(s) that a plurality of loan servicing entities, each with their own loan servicing subsystem 240 infrastructure, may subscribe to the exchange system 200 and thus access the above-described components inside of the system. Loan servicing entities would provide exchange system 200 subscribers, via the router 253 and the Internet 260, with information about each loan such as prepayment, delinquency, default, etc. In an embodiment of the present invention, this information can be provided as continuous live data or via pre-scheduled (i.e., nightly, weekly, etc.) batch uploads. This allows exchange system 200 subscribers to have up-to-date information about each loan within a pool for risk management analysis.

Also located in the outside region of the exchange system 200 is a plurality of workstations 280a–h which, via the WWW 266 (and thus, Internet 260) access the components inside of the exchange system 200. As will be described in more detail below, FIG. 2B shows a workstation representative of each type of subscriber of the exchange system 200. As will be apparent to one skilled in the relevant art(s), each type of subscriber would be provided a different set of GUI screens to access their respective functions of interests within the exchange system 200. Accordingly, as suggested by FIG. 2B, each type of subscriber would access a different subsystem inside of the exchange system 200 (each with their own URL and servers providing the GUI screens).

For example, rather than calling into the loan origination subsystem 240 as described above, consumers may use the workstation 280b to apply for a loan. During processing of the loan, the system 200, via router 262a and/or 262b and the Internet 260, may obtain credit history data from a credit service bureau represented by the frame cloud 268.

In an alternative embodiment of the present invention, the workstations 280, and thus subscribers, may also access the exchange system 200 by a direct telephone dial-up connection without the need to go through the WWW 266 or the Internet 260.

In an embodiment of the present invention, all of the servers (202, 206, 224, 225, 232, 270, and 290) described above would be implemented using a Windows NT™ server platform. Furthermore, each workstation (201, 243, 246, and 280) described above can be realized with a PC workstation running the Microsoft® Windows operating system. The software and hardware architecture of exchange system 200 is described in more detail below with reference to FIG. 4.

While a set of servers (i.e., servers 202, 206, 224, 225, 232, 270, and 290) are shown in FIGS. 2A and 2B for simplicity of explanation, it will be apparent to one skilled in the relevant art(s) that exchange system 200 may be run on a single server as well as in a distributed fashion over a plurality of the servers connected via LAN 201. Further, in an alternate embodiment of the present invention, exchange system 200 may be structured as a multi-tier system rather than the client-server model presented herein.

FIG. 2B, also for simplicity of explanation, illustrates only one workstation 280a–h for each type of subscriber to the exchange system 200. As will be apparent to one skilled in the relevant art(s), however, the workstations 280a–h represents the GUI interface provided to each type of subscriber and thus, a plurality of workstations 280a–h would exist in the system 200, each possibly residing at different physical locations and used by different subscribing entities.

Similarly, while several databases (i.e., databases 203a, 203b, 204a, 204b, 205, 221, 222, 223, 224, and 231) are shown in FIGS. 2A and 2B, it will be apparent to one skilled in the relevant art(s) that exchange system 200 may utilize databases physically located on one or more computers which may or may not be the same as their respective severs. Exchange system 200 may also utilize a different scheme for allocating where the data within the system physically resides.

More detailed descriptions of the components of exchange system 200, as well as their functionality, are provided below. However, a summary of the databases is provided in Table 3 below.

TABLE 3

| DATABASE | DESCRIPTION |
| --- | --- |
| Trade Data 203a, 203b | Contains results data, pool negotiating (bidding) data, and financial date (e.g., prime rate, Dow Jones Industrial Average, etc.) |
| Trading Criteria Archive 204a,204b | Contains rules used by subscribers to identify loans and loan packages to purchase. An example rule may be: [ (FICO > 400) AND (Appraisal_Value_of_Property > $300,000) ] |
| Securitization 205 | Contains mortgage-backed securities (e.g, bond) data and criteria |
| Pool Data Org N 221, 222 | Contains data of published pools for each of N mortgage bankers that subscribes to exchange system 200. |
| Wholesale Criteria Archive 223 | Contains rules used by mortgage bankers to identify loans and loan pools to purchase. |
| Origination Archive 224 | Contains origination data uploaded from origination entities subscribing to exchange system 200. |
| Marketing 231 | Contains list of contacts (i.e., people), and correlations to financial products likely to be or actually owned, and financial products they are likely to purchase. |
| Origination Data 244 | Contains information gathered from borrowers and stored locally at each loan origination subsystem 240 |
| Origination Criteria 245 | Contains rules used by loan originators to identify consumers whom to approve loans to. |
| Servicing 251 | Contains data relevant to servicing of loans such as payment history, default, call (enforcement) history, etc. |

IV. Secure System Interfaces

Figure 3:
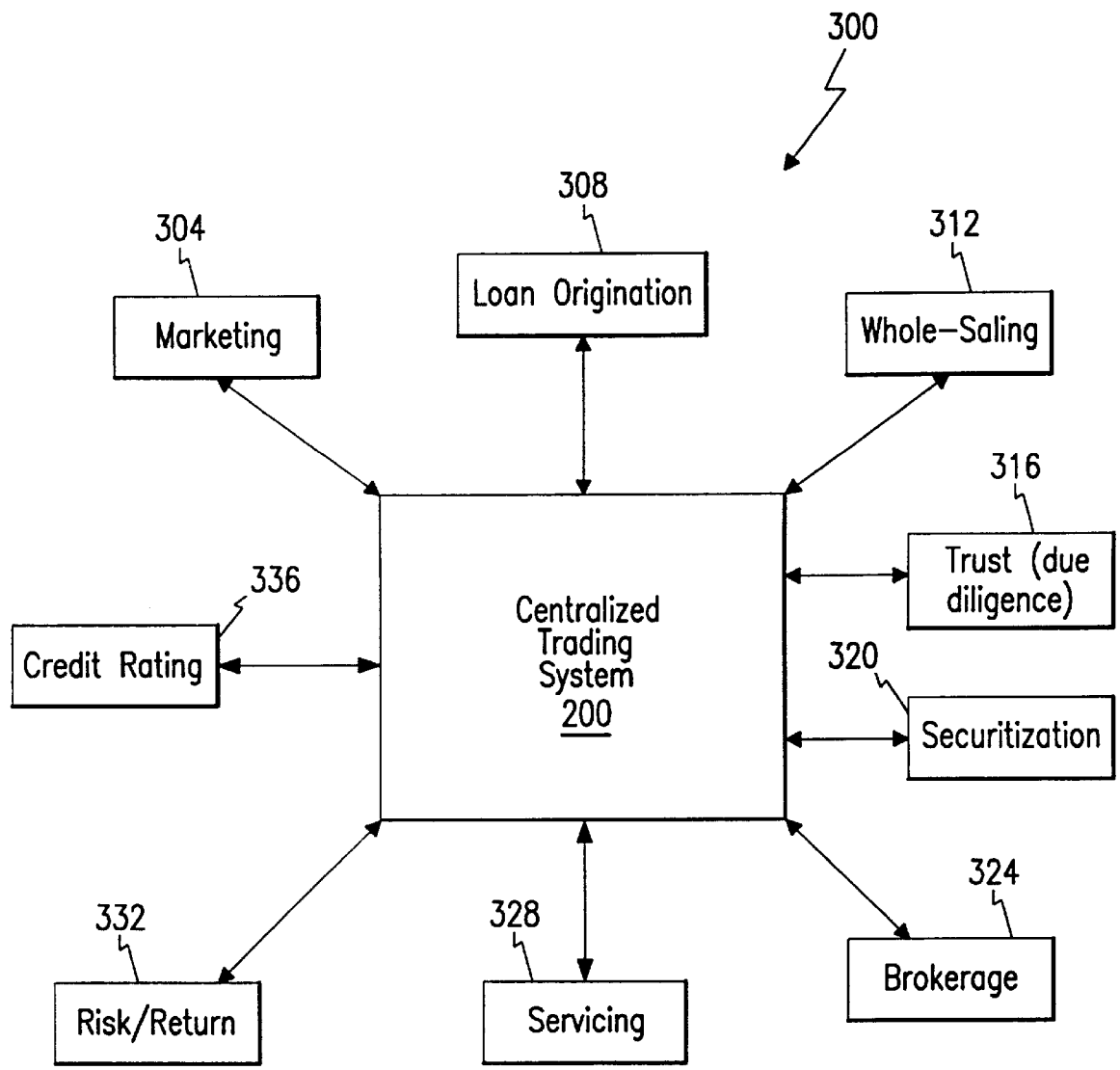
FIG. 3 is a high level block diagram showing the interfaces that occur during the operation of the exchange system according to an embodiment of the present invention.

Referring to FIG. 3, a high level block diagram shows the secure system interfaces 300 that occur during the operation of exchange system 200 according to an embodiment of the present invention. As shown by the arrows connecting the various interfaces to system 200, subscribers (e.g., borrowers, brokers, correspondents, mortgage bankers, servicing companies, investors, capital markets brokers, etc.) can access system 200 in order to upload and/or download information. As will be apparent to one skilled in the relevant art(s), such system access described below can occur via workstations 280a–280h, where the corresponding server (e.g., 202, 206, 224, 225, 232, 270, and 290) provides a GUI, and data is passed to and from databases 203a, 203b, 204a, 204b, 205, 221, 222, 223, 224, and 231, as applicable.

A secure marketing interface 304 allows marketing companies to access system 200 via workstation 280a Marketing companies retrieve information from system 200 such as which of their mailings resulted in loans being originated. Further, marketing companies can retrieve information from system 200 relating to which loan applicants, who were originally targeted by their mailings, were denied loans. Further, the marketing companies can access rules pre-set by the loan originators (e.g., zip codes, age, geographic region, etc.), so that they can accurately target those potential borrowers that fit within the originators' requirements. Interface 304 also shows that the marketing companies send information back to system 200. Such information may include a list of those individuals who received a mailing regarding a specific loan product.

A secure interface 308 allows data flow between system 200 and a loan origination company (i.e., a bank or other commercial lender) via loan origination subsystem 240. A loan originator will collect loan origination information from an applicant (i.e., consumer), usually via the telephone or via the applicant entering some origination information via workstation 280b. This information is then forwarded by system 200 to loan origination subsystem 240 via the WWW 266.

The loan originator will then use the information collected to process the loan and forward information regarding whether the application was approved or denied to the system 200. This information is then archived in origination archive 226 so that it may be accessed in some form by other subscribers of the system 200.

The loan originator, once it has originated a loan or a pool of loans, may send information concerning the loan(s) to the system 200 to post or publish the loans for sale to mortgage bankers.

A secure interface 312 allows mortgage bankers to access system 200, via workstation 280f to (1) pool its own loans together for resale, and/or (2) search for loans that have been posted for sale by loan originators or other mortgage bankers for sale.

In the first instance, an investor may use workstation 280f to review its loans and to search through the loan data using various criteria to select particular loans to be pooled together for sale. These loan pools are stored in databases 221 and 222. Once a mortgage banker has created a loan pool, he can publish it by sending it to the exchange system 210 to be published.

In the second instance, investors use workstation 280d to access system 200 to look for loans for sale. The investors then inputs an offer for certain loans that meet their pre-set rules.

As discussed in further detail below, the mortgage bankers' pre-set rules are archived in criteria archive 223 and are accessible to the loan originators. As such, the loan originators can review these pre-set rules before originating a loan to make sure that its loans will be attractive to the mortgage bankers. This process maximizes returns.

In one embodiment of the present invention, the mortgage bankers can register with system 200 to be notified if any loans are posted for sale that fall within its pre-set rules. Such notification can be made via electronic mail, any type of digital/wireless communications (e.g., by pager, telephone, cellular telephone, personal digital assistant, etc, possibly using Hand-held Device Markup Language (HDML), Voice Markup Language (VoxML), or other similar computer language) or simply upon accessing system 200 via a GUI dialogue box. Further, a seller can contact a particular buyer via system 200 if it has a loan for sale that it believes the buyer would be likely to purchase.

The mortgage bankers can search the available loans on system 200 using various search criteria, either based on the mortgage bankers' pre-set rules, or based on some other criteria, to quickly locate those loans that meet its requirements. For example, if a mortgage banker wants to purchase only loans made to borrowers having a FICO score greater than 600 and an interest rate of 13% or greater, the mortgage banker could use system 200 to search for loans having these criteria. Similarly, the mortgage banker could have pre-set rules, using these criteria, so that they can be notified when such loans, meeting these criteria, are posted for sale.

Once the investor makes an offer for a loan that is accepted by the seller, the mortgage banker must perform a due diligence analysis on the loan to be purchased to make sure it is a valid loan. In an embodiment of the present invention, mortgage bankers can authorize system 200 to automatically initiate transfer of loan files from the seller to a trust company upon purchase of a loan by the mortgage banker. The mortgage banker can select one or more particular trust companies in advance for all of its loans.

A secure interface 316 allows trust companies to access system 200 via workstation 280*c*. Upon receipt of the loan files, the trust company will perform a due diligence analysis on the loan (or on a statistical sampling of several loans from a pool of loans). The due diligence analysis will ensure that the supporting documentation provided by the borrower matches the information the lender relied on in approving the loan (i.e., the information entered into the loan application). Once the due diligence is completed, the trust company will forward a certificate to the mortgage banker which includes verification of the authenticity of the loan(s).

Once the mortgage banker has accumulated several loans, the workstation 280*f*, as discussed above, can be used to post or publish a pool of these acquired loans for sale.

A secure interface 320 allows securitization companies to access system 200 to (1) search for loan pools that have been posted on system 200 for sale by mortgage bankers and (2) to sell mortgage-backed securities that they have created and backed with their loan pools.

In the first instance, the securitization companies access system 200 via workstation 280*d* to look for loan pools for sale and to review information for each loan in a pool and individually accept, deny, or suspend its decision for each loan within the pool. This will result in a revised loan pool for which the securitization company may make an offer. The mortgage banker can then access, via interface 312, the revised loan pool, and either accept the securitization company's offer, create another pool to offer for sale, or reject the offer.

As discussed above, the seller, in this case the investor, can access the securitization companies' pre-set rules, which are stored in the securitization database 205, before posting a loan pool so that a pool that will look particularly attractive to a buyer/investor can be created, thereby maximizing their chances of selling the pool. In one embodiment of the present invention, the securitization companies can ask to be notified by system 200 if any loan pools are posted that fall within its pre-set rules. Such notification can be made via electronic mail, any type of digital/wireless communications (e.g., pager, telephone, cellular telephone, personal digital assistant, etc., possibly using HDML, VoxML, or other similar computer language) or simply upon accessing the system 200 via a GUI dialogue box. Further, a seller can contact a particular securitization company via system 200 if it has a loan pool for sale that it thinks the securitization company would be likely to purchase.

The securitization companies can search the available loan pools on system 200 using various search criteria, either based on the pre-set rules, or based on some other criteria, to quickly locate those loan pools having loans that meet its requirements. Further, the securitization companies can search within a selected loan pool to automatically decline or accept particular loans within a pool that have certain criteria. For example, if a securitization company desires to purchase only loan pools having loans made to borrowers having a FICO score greater than 650 and an interest rate of 12% or greater, the securitization company could use system 200 to search for loans having these criteria. Similarly, the securitization companies could have pre-set rules, using these criteria, so that it can be notified when such loan pools, meeting these rules, are posted for sale.

Once the investor has acquired several loan pools, it can access system 200 via workstation 280*e* to group together the loan pools to back a security (i.e., create a mortgage-backed security). As shown in FIG. 3, an interface 324 allows the brokerage companies to be able to access system 200 via a workstation 280*d* to look for mortgage-backed securities for sale and to negotiate to buy and sell the mortgage-backed securities.

Because the loans are being used as collateral to back a security, they cannot be resold. As such, the securitization company is responsible for servicing the loans for the remainder of their lifetime. This task is often delegated to a servicing company, as discussed below.

A secure interface 332 allows a servicing company, via workstation 280*h*, to access the exchange system 200 to acquire loan information on the loans it has been asked to service and to provide information back to system 200 about any default on the loans.

A secure interface 328 allows trading organization personnel, via the administrative workstation 201, as well as all subscribers via workstation 280*g*, to access exchange system 200 in order to perform certain risk management functions. For example, a mortgage banker who is thinking about purchasing a particular loan, may access data in database 203*a* to determine what a fair price for a particular loan or loan pool might be, based on previous trades of similar loans.

V. Software/Hardware Architecture

Figure 4:
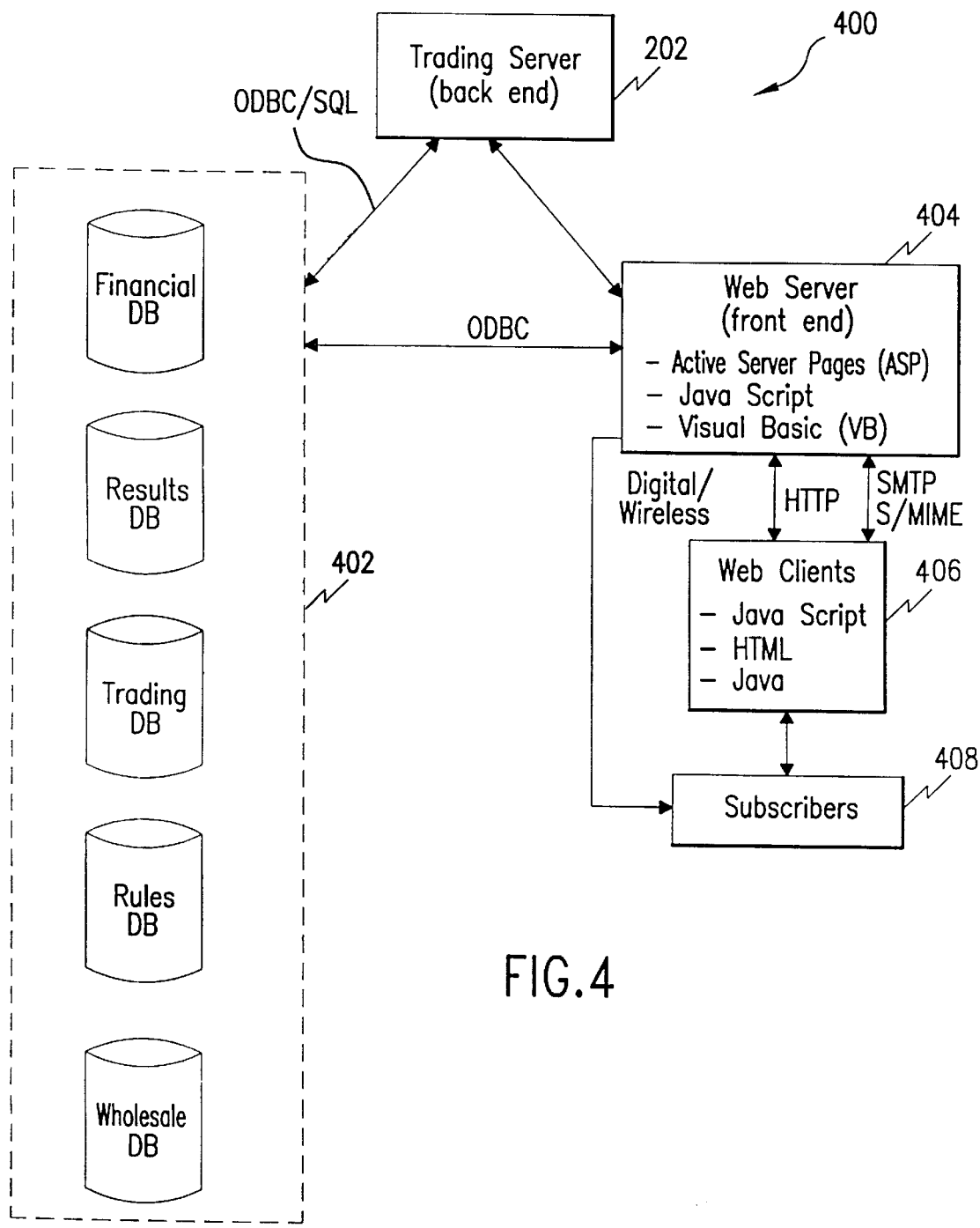
FIG. 4 is a block diagram illustrating the software architecture of an embodiment of the present invention, showing communications among the various components.

Referring to FIG. 4, a simplified block diagram illustrating a software/hardware architecture 400 according to an embodiment of exchange system 200, showing communications among the various components, is shown. The architecture 400 of exchange system 200 includes software code that implements the interfaces 300 (via the workstations 280) during the operation of exchange system 200.

Architecture 400 includes a database 402 which represents any one of the collection of database within the inside region of exchange system 200 (i.e., databases 203*a*, 203*b*, 204*a*, 204*b*, 205, 221, 222, 223, and 224). In an embodiment of the present invention, database 402 is implemented using a high-end object-oriented database product such as Object-Store™ available from Object Design, Inc. of Burlington, Mass. As is well known in the relevant art(s), in an object-oriented database, data is stored as objects and can be interpreted only using the methods specified by its class. The relationship between similar objects is preserved as are references between objects. This allows queries to be faster than with relational databases because an object can be retrieved directly without a search, by following its object identifier.

The database 402 is connected to a Web server 404 which represents any one of the collection of servers within the inside region of exchange system 200 (i.e., servers 202, 206, 224, 225, 270, and 290). As mentioned above, in an embodiment of the present invention, all of the servers would be implemented using a Windows NT™ server platform running ("back-end") software implemented in a high level programming language such as the C++ programming language.

In an embodiment of the present invention, the server 404 software application communicates with the database 402 using a C++ object interface. In the special case of the trading subsystem server 202, the database server 207 (not represented in FIG. 4) interconnects it to the databases 203*a* and 204*a*. In an embodiment of the present invention, the server 207 is a Sun SPARC workstation running the Solaris operating system that provides a robust threading model for fast access to data. The ObjectStore™ database product allows the server 207 to access information within the databases 203*a* and 204*a* by "serving" pages of memory to the "client" (i.e., trading subsystem server 202). The trading subsystem server 202 then performs the management (i.e., opening, closing, etc.) of sessions.

The database server 207 would communicate with the databases 203*a* and 204*a*, and the server 202 using a structured query language (SQL) commands interface.

The sever 404 also provides the secure GUI "front-end" for exchange system 200. The GUI front-end can be customized for each type of subscriber to the system. In an embodiment of the present invention, the front-end is implemented using the Active Server Pages (ASP), Visual BASIC (VB) script, and JavaScript™ sever-side scripting environments that allow the creation of dynamic Web pages.

These Web pages are provided to the subscribers of the exchange system 200 via the workstations 280*a–h* (collectively shown as "Web Clients" 406), using the Hypertext Transfer Protocol (HTTP) thereby providing the front-end to the subscribers 408 (e.g., borrowers, brokers, correspondents, mortgage bankers, servicing companies, investors, capital markets brokers, etc.). The user interface for Web Clients 406 is browser implemented, using Java, JavaScript™, and Hypertext Markup Language (HTML). As such, the external workstations 222 and the internal workstations 224 may be realized with IBM™ (or compatible) PCS running the Windows NT™ or Windows 95/98™ operating system.

In an embodiment of the present invention, as mentioned above, subscribers 408 may request that system 200 notify them if any loans, loan pools, or desired information which fall within its pre-defined rules are available. As discussed above, such notification can be made via electronic mail, any type of digital/wireless communications or simply upon accessing the system 200 via a GUI dialogue box. Thus, the server 404 also communicates with the Web clients 406 via the well-known Secure Multipurpose Internet Mail Extensions (S/MIME) or Simple Mail Transfer Protocol (SMTP) protocols for electronic mail. Also, the server 404, as suggested by FIG. 4, may also communicate directly with the subscribers 408 by any known digital/wireless communication means (e.g., by pager, telephone, cellular telephone, personal digital assistant, etc., possibly running HDML, VoxML, or other similar computer language).

VI. System Operation

A. Marketing

Figure 5:
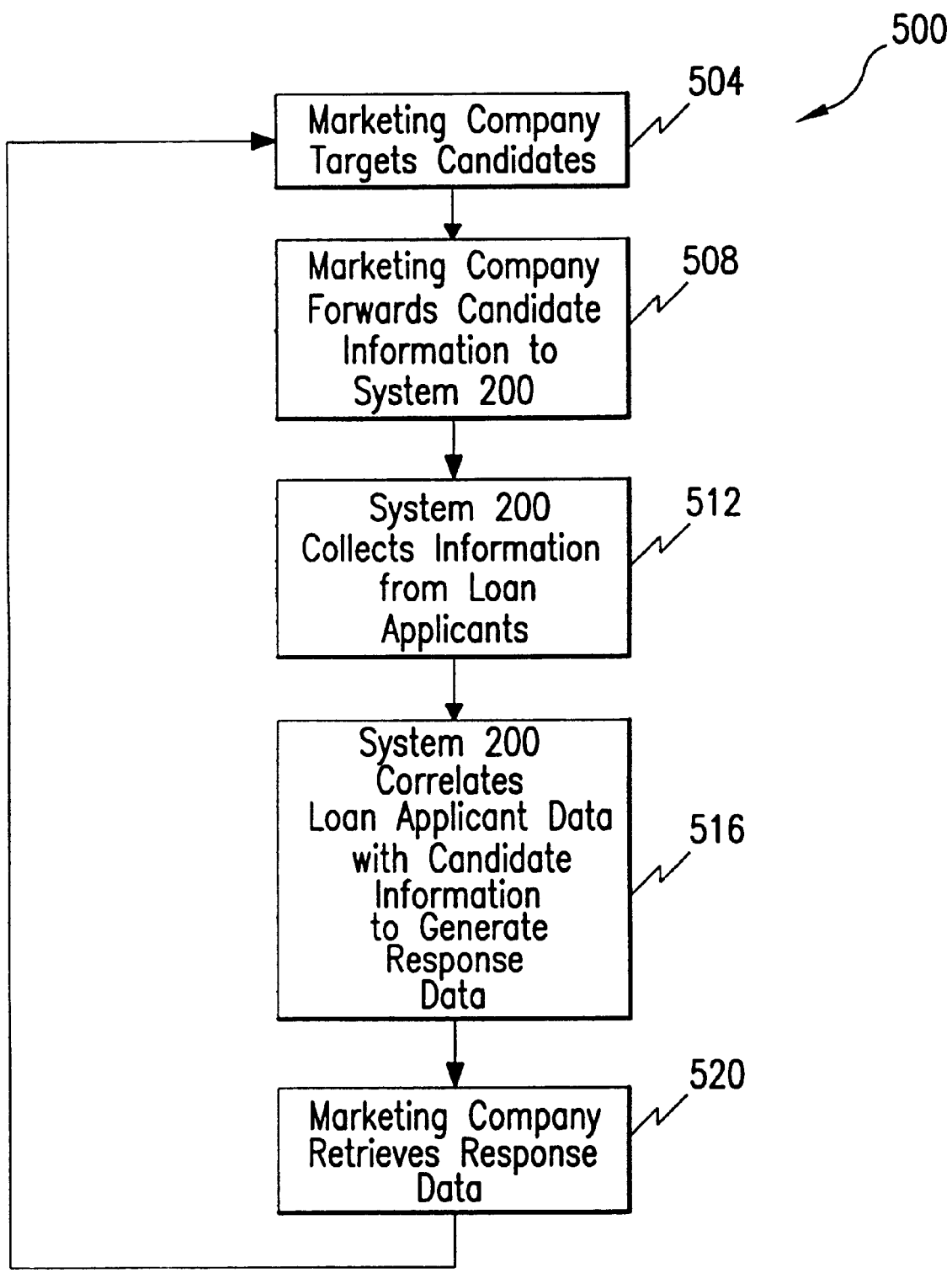
FIG. 5 is a flowchart showing the data flow between the centralized exchange system and a marketing company, according to an embodiment of the present invention.

Referring to FIG. 5, a flow chart 500 representing an exemplary interaction between a marketing company and system 200 in an embodiment of the present invention is shown.

In a first step 504, the marketing company selects potential loan candidates for a marketing campaign and targets those candidates via direct mailings, TV, print adds, or other similar marketing techniques. In the present invention, the potential loan candidates may be targeted based on whether their credit or personal information matches rules pre-set by lenders.

In a step 508, the marketing company then sends the relevant data to system 200. This data may include, in the case of direct marketing, a list of the names of each individual who received a mailing. In the case of TV or print ad campaigns, the data may include a set of criteria which was used to target the market for the campaign. For example, the marketing company may have decided to target individuals between the ages of thirty and forty, and with an annual gross income of greater than $75,000. In this case, the TV and print ads would appear on programs or in newspapers and magazines typically seen by people that fit these criteria.

In a step 512, system 200 collects information from loan applicants. This data may come from different sources. For example, the loan applicant may enter the data directly into system 200 by applying for a loan via workstation 280*b*. Alternatively, a loan agent at the loan origination subsystem 240 may enter the data into system 200 based on the information collected from the applicant via loan origination interface 243 taken over the phone. In the latter case, the collected loan origination information is uploaded from subsystem 240 to system 200 at predetermined intervals. In one embodiment, this upload occurs once daily. This loan applicant information may include, for example, the loan applicant's name, address, age, annual or monthly gross income, how the applicant heard about the particular loan product, and whether the loan applicant's loan was approved.

In a step 516, system 200 correlates or matches the loan applicant information with the candidate information from the marketing company to generate response data, which indicates those applicants who responded as a result of the marketing company's campaign. This response data is sent back to marketing subsystem 230 via router 262*a* and archived in database 231.

In a step 520, the marketing company retrieves the response data from database 231 of subsystem 230, and uses this response data in step 504 to develop the next set of criteria to use to target potential candidates. The response data may be uploaded from loan origination subsystem 240 via router 262*a* and into database 231 at regular intervals. In one embodiment of the present invention, upload of this response data occurs once daily.

B. Loan Origination

Figure 6:
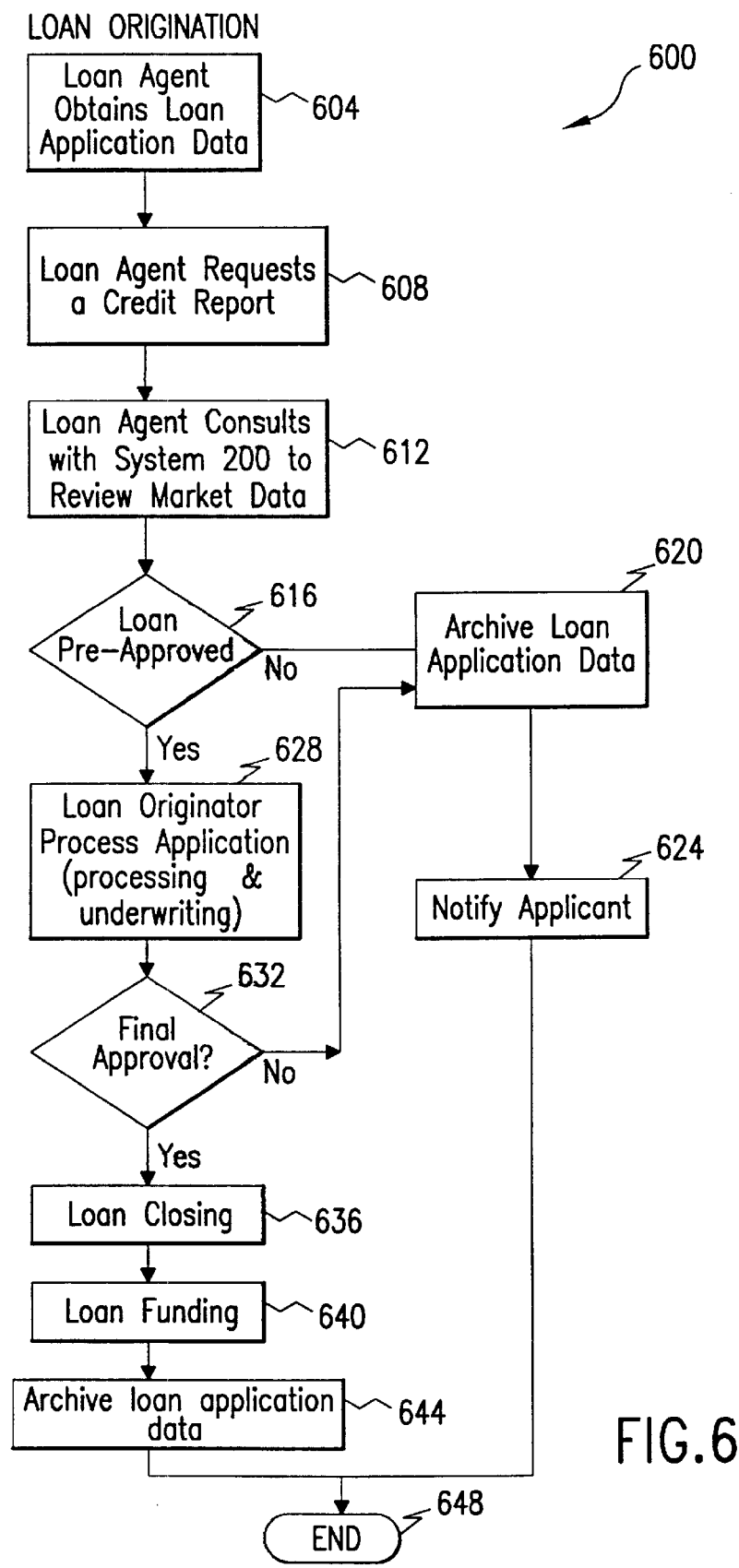
FIG. 6 is a flowchart showing the data flow between the centralized exchange system and a loan origination company, according to an embodiment of the present invention.
Figure 11:
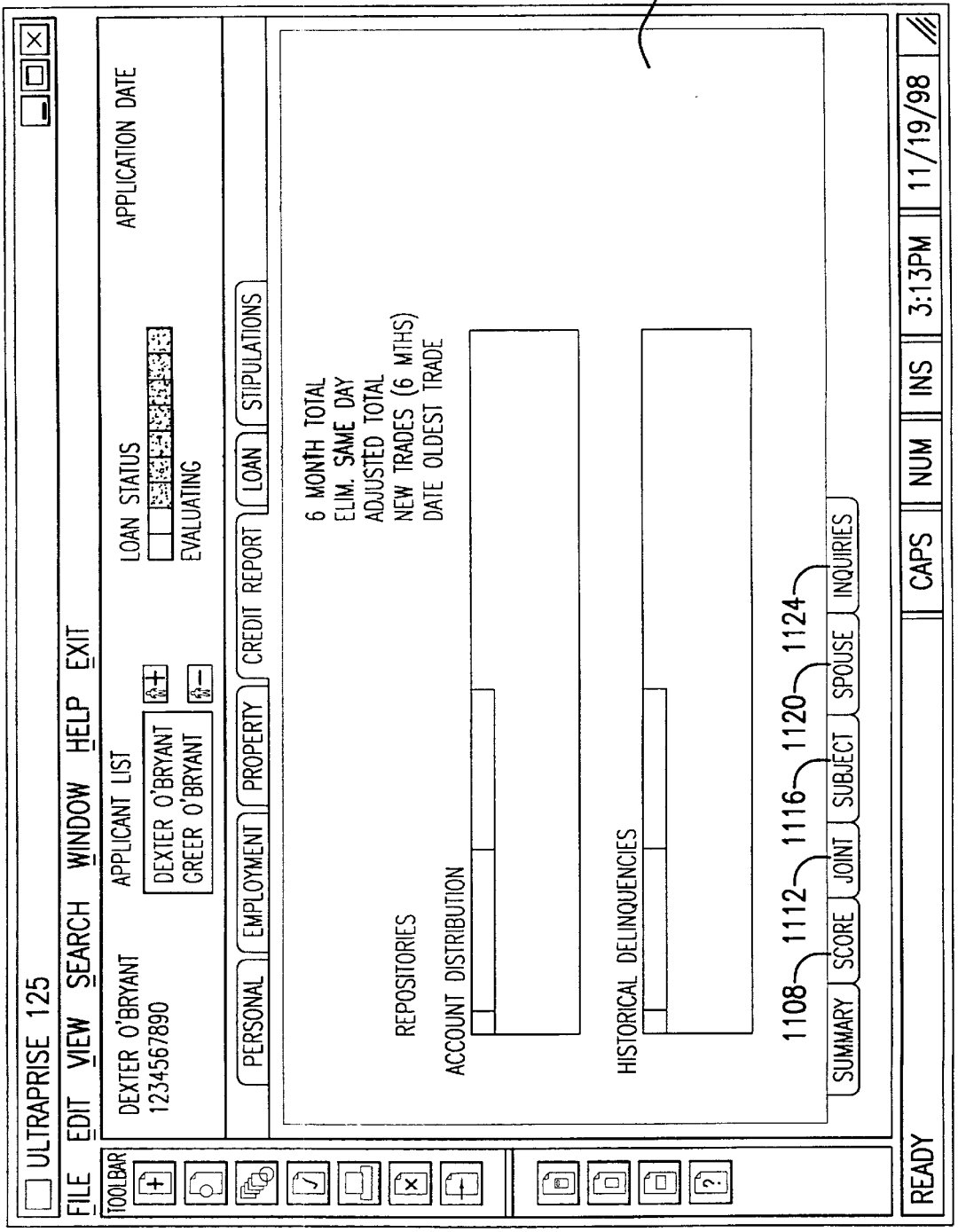

Referring to FIG. 6, a flow chart 600 representing an exemplary interaction between a loan originator and system 200 in an embodiment of the present invention is shown.

In a step 604 of flow chart 600, a loan agent at the loan originator obtains loan application data from a potential borrower. This data can be obtained by the loan agent via system 200. For example, if the potential borrower applies for the loan on-line, at the system web site, system 200 will then notify the loan originator of the loan application and may download the loan application data to loan origination subsystem 240 for processing. Alternatively, the loan application data may be obtained by the loan agent via a call center, in which the applicant calls into the call center and provides his information to the loan agent over the telephone. In this case, the loan agent may enter the loan application data via loan origination interface 243 for subsequent uploading to system 200.

FIGS. 7–14 show exemplary Graphical User Interfaces (GUIs) of an embodiment of system 200 for use by a loan agent when interfacing with system 200. In a preferred embodiment of the present invention, these GUIs are used on the loan agents' workstation, shown as loan origination interface 243.

As shown in FIG. 7, a loan agent, Tom Smith, has a personal account on system 200, in which his current loan application data is stored. A GUI 702, shown in FIG. 7, includes a window 704 to display the primary applicant's name, the loan request amount and the status of the loan application. GUI 702 also provides the loan agent with a loan summary window 706 to display detailed information for each pending loan application. Each time a new loan application is initiated, the application is added to the loan agent's account.

Figure 8:
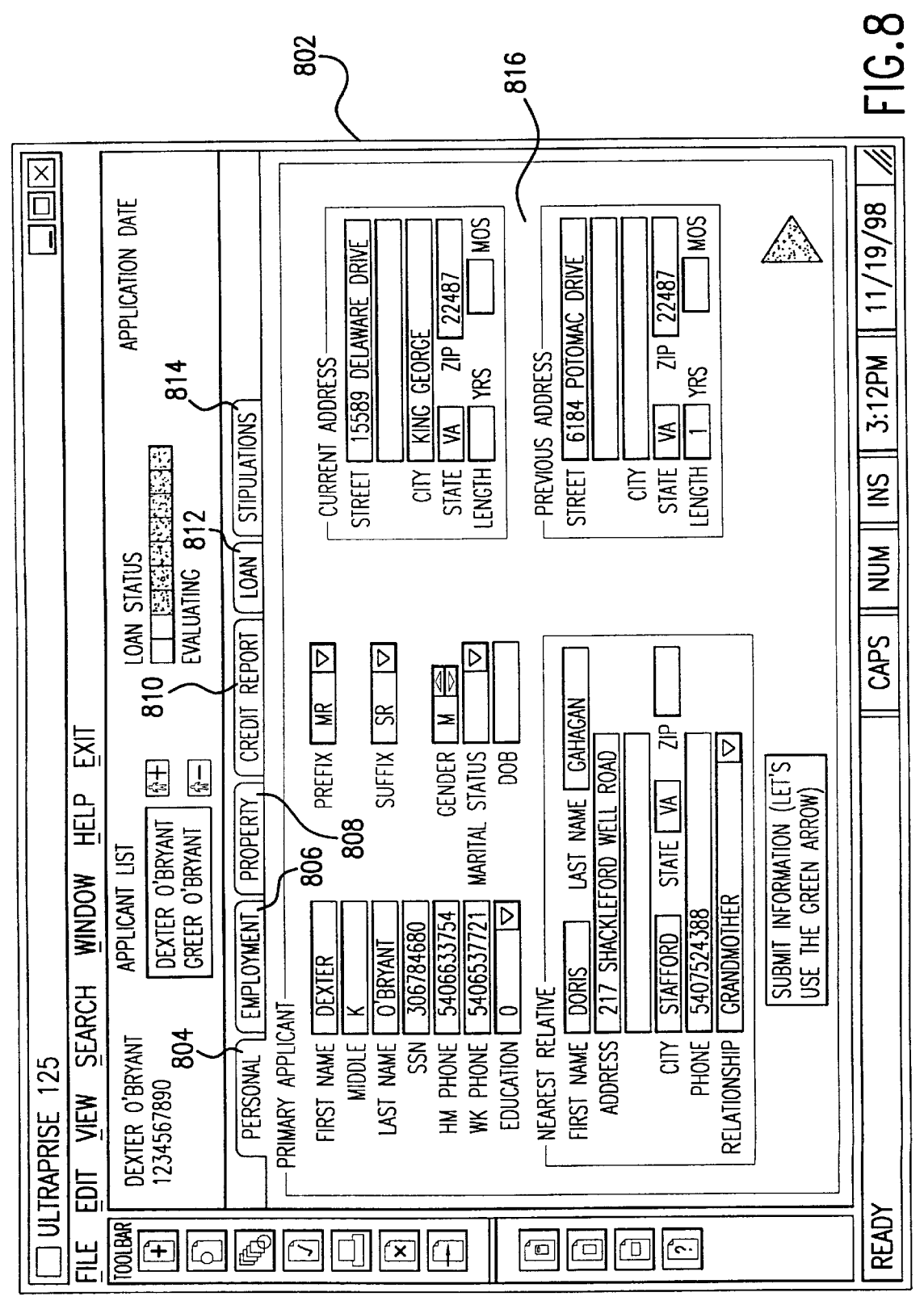

As shown in FIG. 8, to originate or update a loan application, system 200 provides the loan agent with a GUI 802 that is divided into six separate screens, noted by the tabs 804, 806, 808, 810, 812 and 814 across the top of GUI 802. These tabs are labeled Personal, Employment, Property, Credit Report, Loan and Stipulations, respectively.

A GUI 816 corresponding to tab 804 is shown in FIG. 8. GUI 816 permits the loan agent to input each loan applicant's personal information directly into loan origination interface 243. Examples of such personal information include the applicant's name, social security number, phone numbers, date of birth, addresses (current and previous) and nearest relative.

Figure 9:
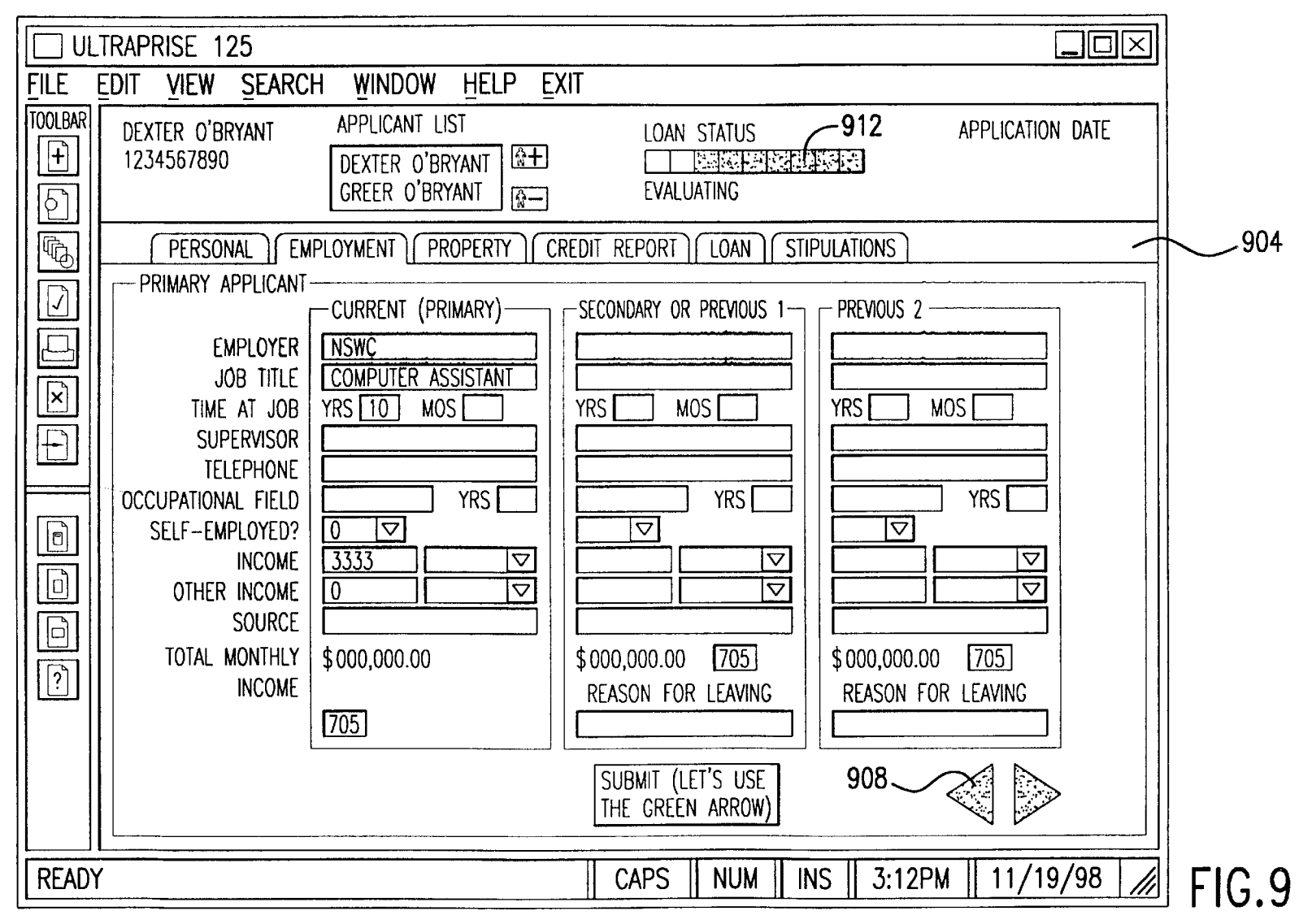

A GUI 904 corresponding to tab 806 labeled "Employment" is shown in FIG. 9. GUI 904 permits the loan agent to input each loan applicant's employment information directly into loan origination interface 243. Examples of such employment information include the name of the applicant's primary and secondary or previous employers, the applicant's job title, time at the job, supervisor, phone numbers, and income. An arrow 908 at the lower right corner of GUI 904 allows the loan agent to easily flip between the GUIs for each tab. Further, a loan status bar 912 at the top of GUI 904 depicts a graphical representation of the status of the loan application. Each of the GUIs shown in FIGS. 7–14 have a similar loan status bar 912.

A GUI 1004 corresponding to tab 808 labeled Property is shown in FIG. 10. GUI 1004 permits the loan agent to input information about the loan applicants' property directly into loan origination interface 243. Examples of such information include the property address, property type, taxes, insurance costs, HOA dues and estimated value of the property. Additional tabs 1008 and 1012 at the lower left of GUI 1004 can be used to access additional GUIs (not shown) to input information regarding any liens on the property and the appraisal information for the property.

Referring to FIG. 1, a GUI 104 corresponding to tab 810 labeled Credit Report is shown. GUI 1104 permits the loan agent to access summary information about each loan applicant's credit score from system 200. In one embodiment of the invention, the information relating to credit score is downloaded directly from a credit reporting agency via credit bureau frame cloud 268. Additional tabs 1108, 1112, 1116, 1120 and 1124 appear at the lower left of GUI 1104. Tab 1108 can be used to access an additional GUI (not shown) which includes more detailed information on the applicant's credit score. Tab 1112 can be used to access an additional GUI (not shown) which includes information relating to the credit information for a joint applicant. Tab 1116 can be used to access an additional GUI (not shown) which includes information relating to the loan application. Tab 1120 can be used to access an additional GUI (not shown) which includes information relating to the applicant's spouse's credit report. Tab 1124 can be used to access an additional GUI (not shown) which includes information relating to any inquiries that need to be made to confirm certain loan application information.

Figure 12:
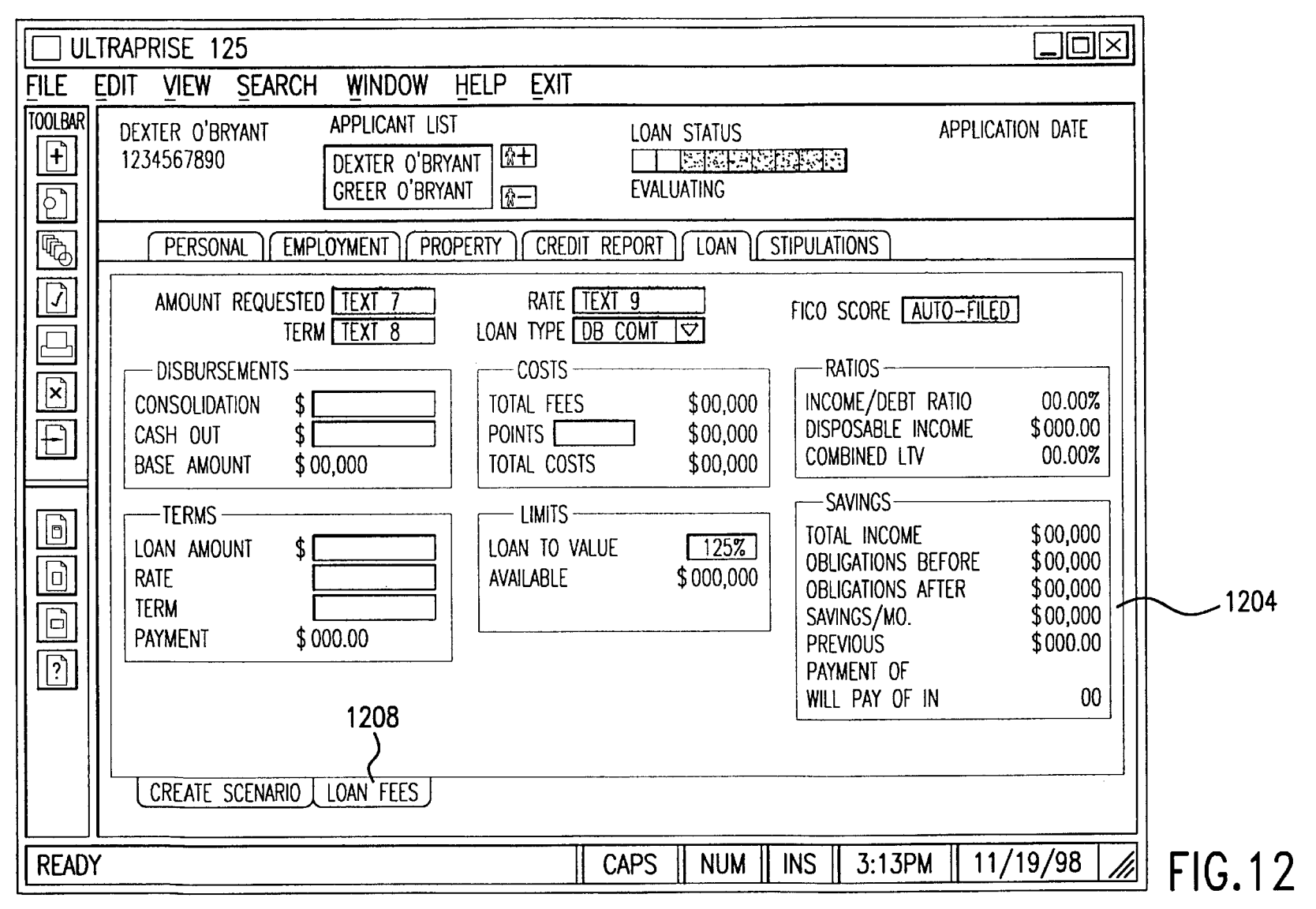

Referring to FIG. 12, a GUI 1204 corresponding to tab 812 labeled "Loan" is shown. GUI 1204 permits the loan agent to input and access information about the loan directly into and from loan origination server 242. Examples of loan information which may be input by the loan agent, include amount requested, term, rate, loan type, points, loan to value ratio. Examples of loan information which are supplied by loan origination server 242 include, FICO Score, income/debt ratio, disposable income, and savings and payment information. An additional tab 1208 appears at the lower left of GUI 1204. Tab 1208 can be used to calculate loan fees associated with the applicant's loan.

Figure 13:
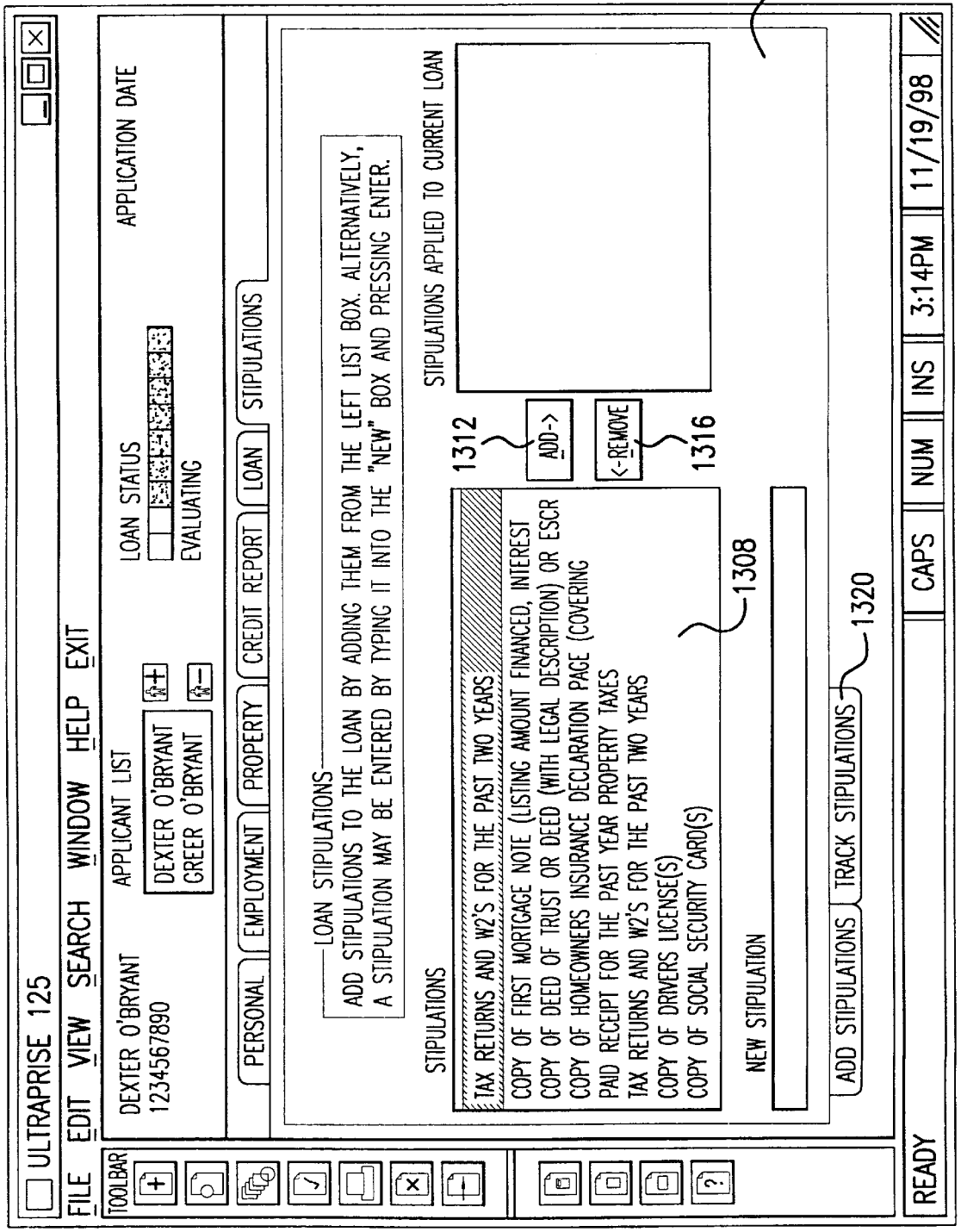

Referring to FIG. 13, a GUI 1304 corresponding to tab 814 labeled Stipulations is shown. GUI 1304 permits the loan agent to set certain stipulations relating to the loan directly into system 200. Common stipulations appear in a window 1308 on the left side of GUI 1304. Examples of such common stipulations include a requirement that for approval, the loan agent must obtain tax returns and W2 forms of the applicant for the past two years. Buttons 1312 and 1316 in the middle of GUI 1304 allow the loan agent to add and remove stipulations from the list in window 1308. An additional tab 1320 appears at the lower left of GUI 1304. Tab 1320 can be used to track the stipulations to mark when all of the stipulations have been met.

Figure 14:
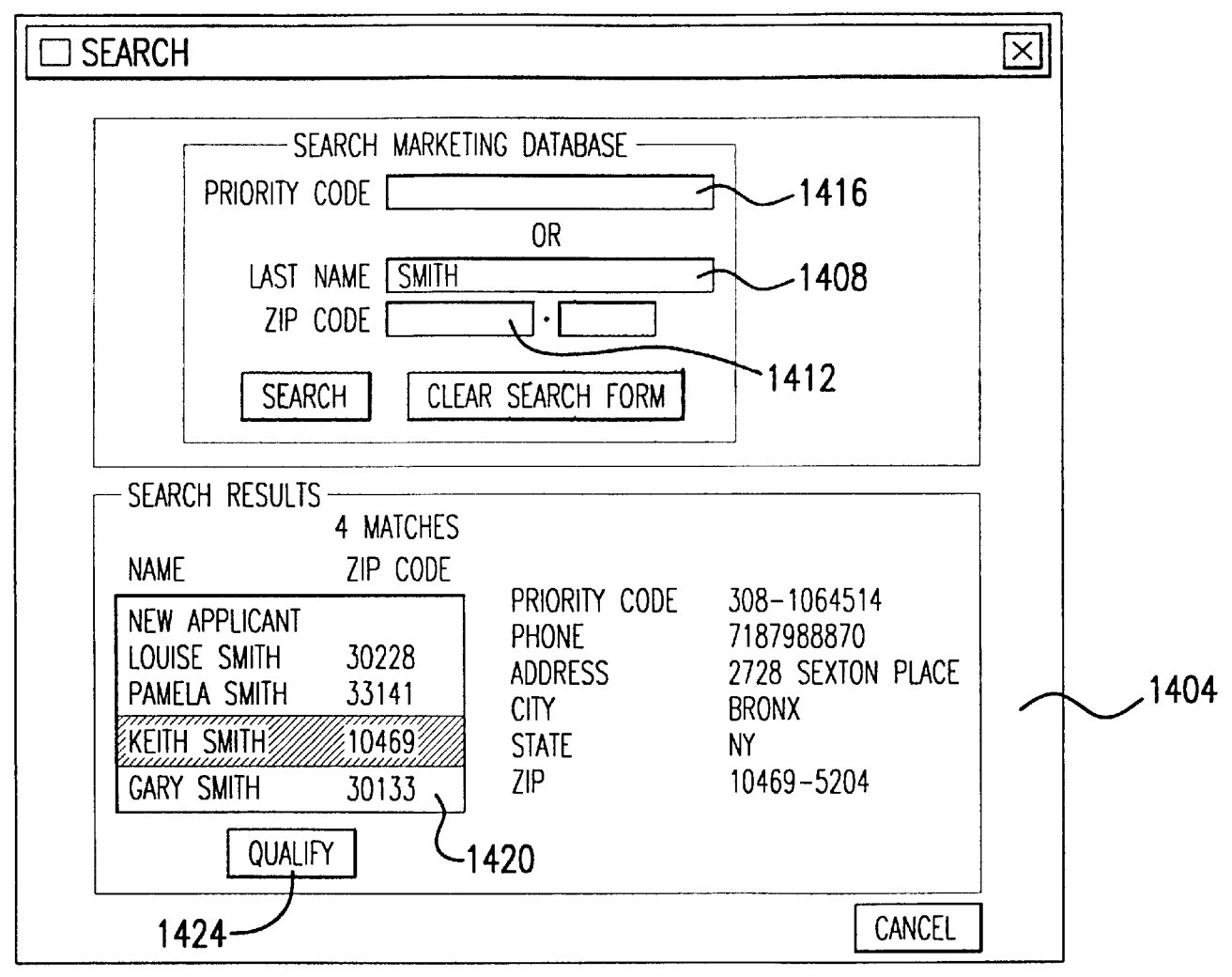

Referring to FIG. 14, a GUI 1404 shows an interface that can be used by the loan agent to search the marketing database for preliminary applicant information. When a loan agent receives a call from an applicant, the marketing database can be searched, using, for example, the applicant's last name and zip code, as shown in windows 1408 and 1412, or using a priority code, as shown in a window 1416, to match the applicant with the pre-existing information in the marketing database. The search results are displayed in a window 1420. As shown in FIG. 14, depending on the detail of the search information, more than one match may appear in window 1420. The particular applicant's name is then highlighted, and the applicant information for that applicant is displayed to the right of window 1420. When the user depresses a button 1424, labeled "Qualify", the selected applicant's information is automatically entered into GUI 704 so that the loan agent must only verify this information and does not need to manually re-enter this information, thereby saving time.

Returning now to FIG. 6, in a step 608, the loan originator requests a credit report from a credit reporting agency. In the embodiment shown in FIGS. 2A and 2B, this request is sent to the credit reporting agency via credit bureau frame cloud 268. System 200 is configured so that the information obtained from the credit agency is automatically entered into the proper cells in GUIs 1104 and 1204.

In a step 612 the loan originator may consult with portfolio subsystem 220 for market data relating to the types of loans currently in demand and the pre-set rules for wholesalers relating to loan purchase. This will enable the loan originator to know which types of loans to originate, and which types of borrowers look most attractive to the mortgage bankers.

In a step 616, the loan agent then evaluates the applicant's loan information, including credit score, and determines whether to pre-approve the applicant's loan request.

If the loan is not approved, loan application information is archived in a loan application data warehouse of system 200, as shown in a step 620. In the embodiment of the present invention shown in FIGS. 2A and 2B, the loan application data warehouse includes, for example, databases 204a, 204b, 226 and 231. As would be apparent to one skilled in the relevant art(s), the loan application data warehouse is a collection of databases, and provides programming logic to allow a user to access all of the data in the databases at the same time. Returning now to FIG. 6, the applicant is then notified that the loan was declined, as shown in a step 624 and the interface between the loan originator and system 200 ends at a step 628.

If the loan is pre-approved, the loan application data is sent to the loan processor for processing and then to the underwriter for final approval, as shown in a step 632. There are similar GUIs (not shown) available through workstation 243 of loan origination subsystem 240 for use by the loan processors and underwriters to process and approve the loan.

In a step 636, the manager of the loan origination company then determines, using workstation 246, whether to give final approval to the applicant's loan request. If final approval is denied, the loan application data is archived in origination archive 226 of the loan application data warehouse, in step 620 and the flow follows as described above. If the loan is given final approval, the loan originator and application proceed through loan closing in a step 640 and funding is provided to the loan applicant in a step 644. Similar GUIs (not shown) are available through system 200 for use in loan closing step 636.

In a step 644, the loan application data for the approved loans is sent to system 200 to be archived in origination archive 226 of the loan application data warehouse, and the interface between the loan originator and system 200 ends at step 628. As explained above, in one embodiment, the loan application data, including both data for approved and unapproved loans, is uploaded to origination archive 226 once daily.

C. Exchange System

A person wishing to sell a loan or loan pool may access system 200 via workstation 280d to publish a loan or loan pool for sale. In the case of a loan pool, the seller may first access system 200 via workstation 280f to create the loan pool. Workstation 280f can be used to search currently available loans for a seller using certain predetermined criteria (e.g., FICO score, loan amount, loan term, etc.) to generate a pool of loans satisfying the search criteria. This pool can then be saved and stored in databases 221 and 222 of portfolio subsystem 220.

Figure 15A:
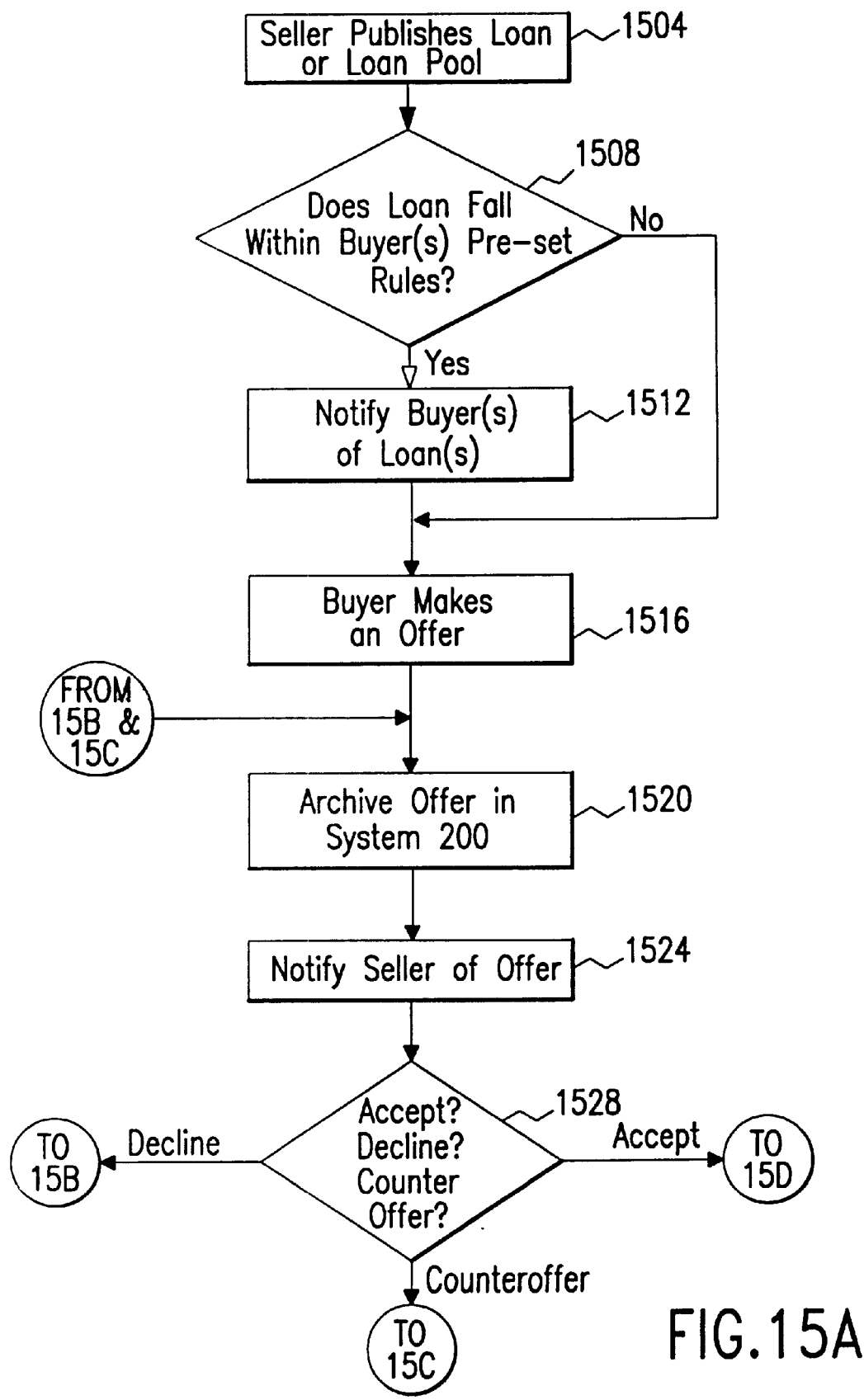
FIGS. 15A–15D are flowcharts showing the buying and selling of loans using the centralized exchange system, according to an embodiment of the present invention.

As shown in FIG. 15A, a seller wishing to sell a loan or loan pool publishes the loan(s) for sale on exchange system 200, as shown in a step 1504. The seller can publish the loans either by entering the loan information manually or uploading via workstation 280d or retrieving the loan information from origination archive 226 or databases 221 and 222 of portfolio subsystem 220.

In one embodiment, subscribers each have a profile archived in system 200. The profile includes the subscriber's contact information, such as, the name of the company for which the subscriber works, the subscriber's telephone number(s), fax number(s), address information and electronic mail address information. The profile also includes a list of all loans or loan pools that have been published by the subscriber for sale in system 200. Other subscribers can access this profile information for review. The subscriber can also access his own profile to update the information therein. In one embodiment, the subscriber can set up his rules for his profile using the loan criteria to indicate the conditions under which the subscriber wishes to be notified by the system of a published loan or loan pool. The subscriber may be provided with the option of whether to maintain his pre-set rules as private, or whether to allow other subscribers to access them.

After the loan(s) are published, exchange system 200 will test the loan information against the pre-set rules for its registered buyers, as shown in a step 1508. If the loan falls within a particular buyer's pre-set rules, exchange system 200 may notify the buyer or buyers of the publication of the loan(s), as shown in a step 1512. This notification can occur in a variety of ways, depending on how the buyer pre-registered to be notified. For example, the exchange system 200 might send an automatic electronic mail, telephone call, or page to the buyer with notification of a loan has been added that falls within the buyer's rules and advising the buyer to check the web site via workstation 280d. Such notifications can be sent via electronic mail, pager, telephone, cellular phone, or hand-held computer.

In one embodiment, when the subscriber logs onto system 200, he receives a "buy alert" that displays new loans or loan pools that have entered the system 200 and that meet the subscriber's pre-set rules. Also, while the subscriber is logged into his account on system 200, a "buy alert" may flash on the subscriber's computer screen if a new loan or loan pool meeting his pre-set rules enters the system.

In one embodiment, a trading company profile may also be provided. If a subscriber is interested in a particular loan pool, he can use the trading company profile to find out information on the company that published the loan pool. This profile can include information such as contact information and contact persons at the trading company, years in business, net worth, financial product offerings, monthly loan volume and so on.

If the loan does not fall within any buyers' pre-set rules, notification step 1512 is skipped and the loan remains published on exchange system 200. The buyer can access the loan information via workstation 280d. In one example, a GUI 1804 is provided to the buyer, as shown in FIG. 18. GUI 1804 presents information on each loan in the loan pool offered for sale to the buyer and allows the buyer to search the loan pool using certain criteria. For example, as shown in a GUI 2204 of FIG. 22, the buyer could search the loan pool for all loans with a FICO score greater than 639. Those loans meeting the selected criteria would be automatically accepted, while all other loans would be declined. The user can also manually accept, decline or suspend individual loans in the pool, using pull down arrow 1808 of GUI 1804. In one embodiment, the data in GUI 1804 is provided in a Microsoft Excel spreadsheet format. In order to decide whether to accept a particular loan, the buyer can also review more specific details on each loan in the pool, as shown in a GUI 2104 of FIG. 21A–21C.

As shown in the lower left of GUI 1804 there are two tabs 1812 and 1816. The tab 1812, labeled "Detail" displays the information shown in FIG. 18. The tab 1816, labeled "Summary" displays the summary information shown in FIG. 19 in a GUI 1904. The summary data is divided into three windows 1908, 1912 and 1916, which display information for all accepted, declined and suspended loans from the loan pool in FIG. 18. This allows the buyer, after performing a search of a loan pool, to use the summary information to determine what type of offer to make for the remaining, accepted loans from the pool.

In one embodiment, summary information on a pool can also be displayed graphically. For example, a pie graph of the distribution of all loans in a pool by FICO score may be used to graphically characterize a loan pool. A similar graph can be generated after the buyer performs a search to show only those loans that meet the search criteria. The summary may also include information such as weighted averages of FICO score, loan term, loan rate, combined loan-to-value ratio, and debt ratio of the loans in the pool. This information can be generated both before and after a buyer performs a search.

Returning now to FIG. 15A, a step 1516 represents when a buyer makes an offer for a loan or loan pool. The buyer can enter his offer via workstation 280d. Exchange system 200 archives all offers made in database 203a, as shown in a step 1520. This information is subsequently used to calculate market prices for different types of loans.

The seller who published the loan(s) is then notified by exchange system 200 that an offer has been made, as shown in a step 1524. Notification can be effected to the seller in any of the same manners as discussed above with respect to step 1512. Alternatively, the seller may have a personal account in exchange system 200 that he periodically checks. Exchange system 200 may notify the seller of incoming offers simply by posting the offer to the seller's account.

As shown in a decision step 1528, the seller must then decide whether to accept or decline the offer or whether to make a counteroffer. If the offer is declined, the flowchart continues in FIG. 15B.

Figure 15B:
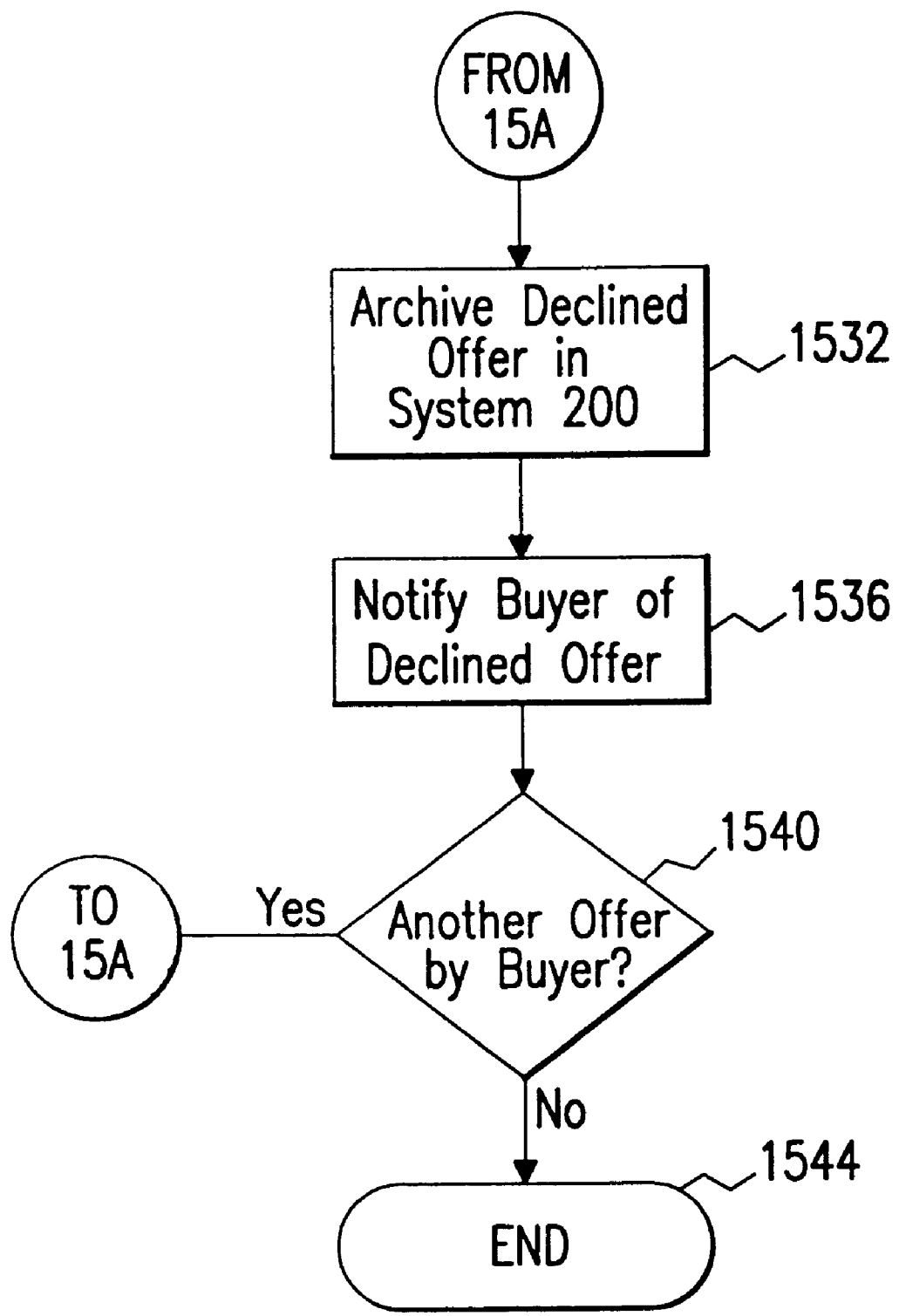

As shown in a step 1532 of FIG. 15B, exchange system 200 archives the declined offer in database 203a. This information is also used to calculate market prices for loans.

In a step 1536, exchange system 200 notifies the buyer that his offer has been declined, and queries, as shown in a step 1540, if the buyer has another offer. If the buyer does not make another offer, the flow ends at a step 1544. If, however, the buyer makes another offer, the flow returns to FIG. 15A, at step 1520, which archives the second offer in exchange system 200, checks to see if the loan is still available and notifies the seller of another offer.

Figure 15C:
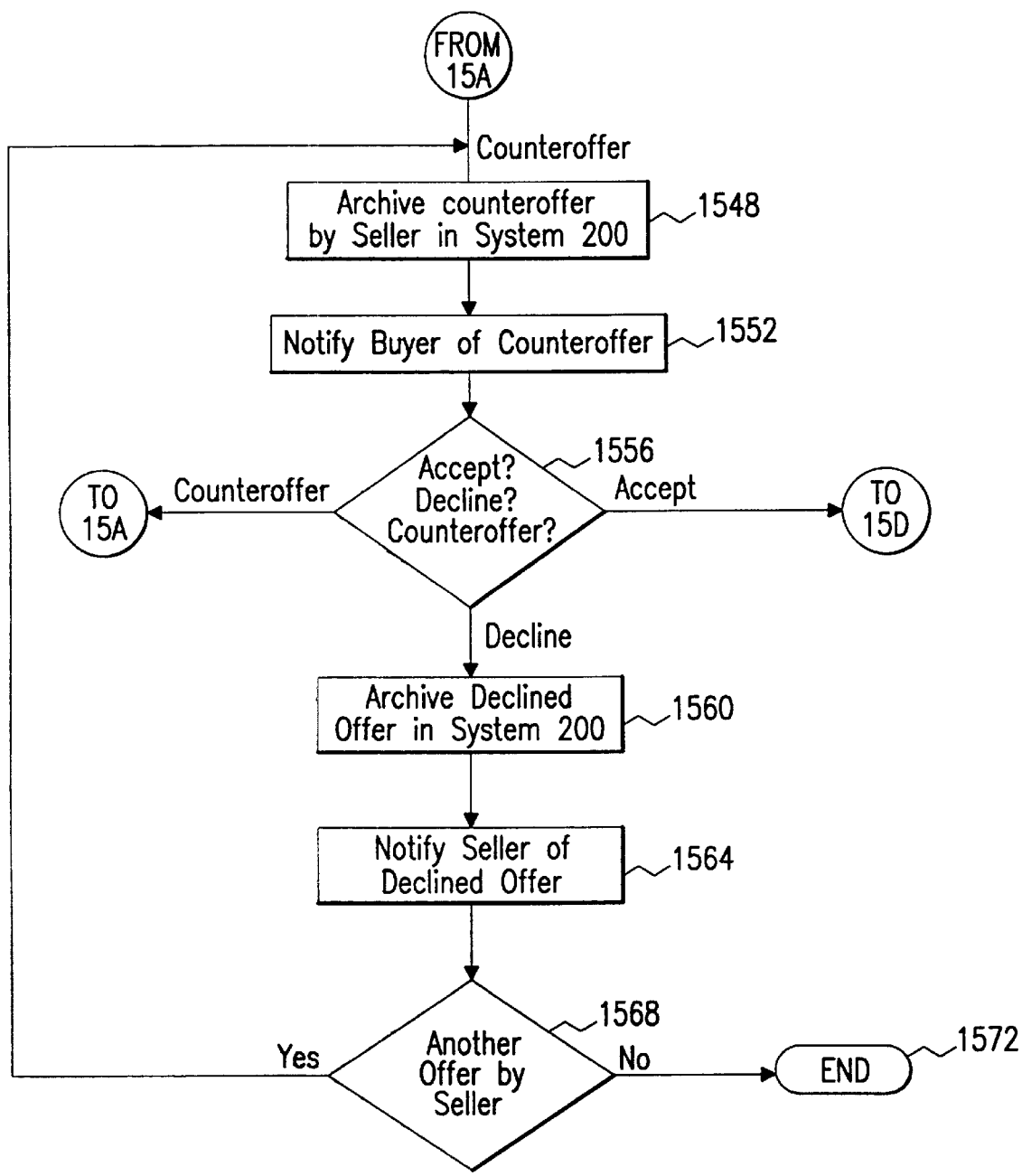

Returning to decision step 1528, if the seller makes a counteroffer to the buyer, the flow continues to FIG. 15C. The seller's counteroffer is archived in database 203a of trading subsystem 210, as shown in a step 1548. The buyer is then notified of the counteroffer as discussed above, as shown in a step 1552.

The buyer then must decide whether to accept or decline the counteroffer or make a second counteroffer, as shown in a decision step 1556. If the buyer makes a second counteroffer, exchange system 200 returns to step 1520 in FIG. 15A. The buyer's counteroffer is archived in exchange system 200 and continues as described above.

If the buyer declines the counteroffer, exchange system 200 archives the declined offer in database 203a, as shown in a step 1560. This information is used by exchange system 200 to calculate the market value of loans. In a step 1564, exchange system 200 notifies the seller of his declined counteroffer and inquires if the seller would like to make another offer, as shown in a step 1568. If no further offer is made by the seller, the flow ends at a step 1572. If another offer is made by the seller, the flow returns to step 1548 at the top of FIG. 15C.

Figure 15D:
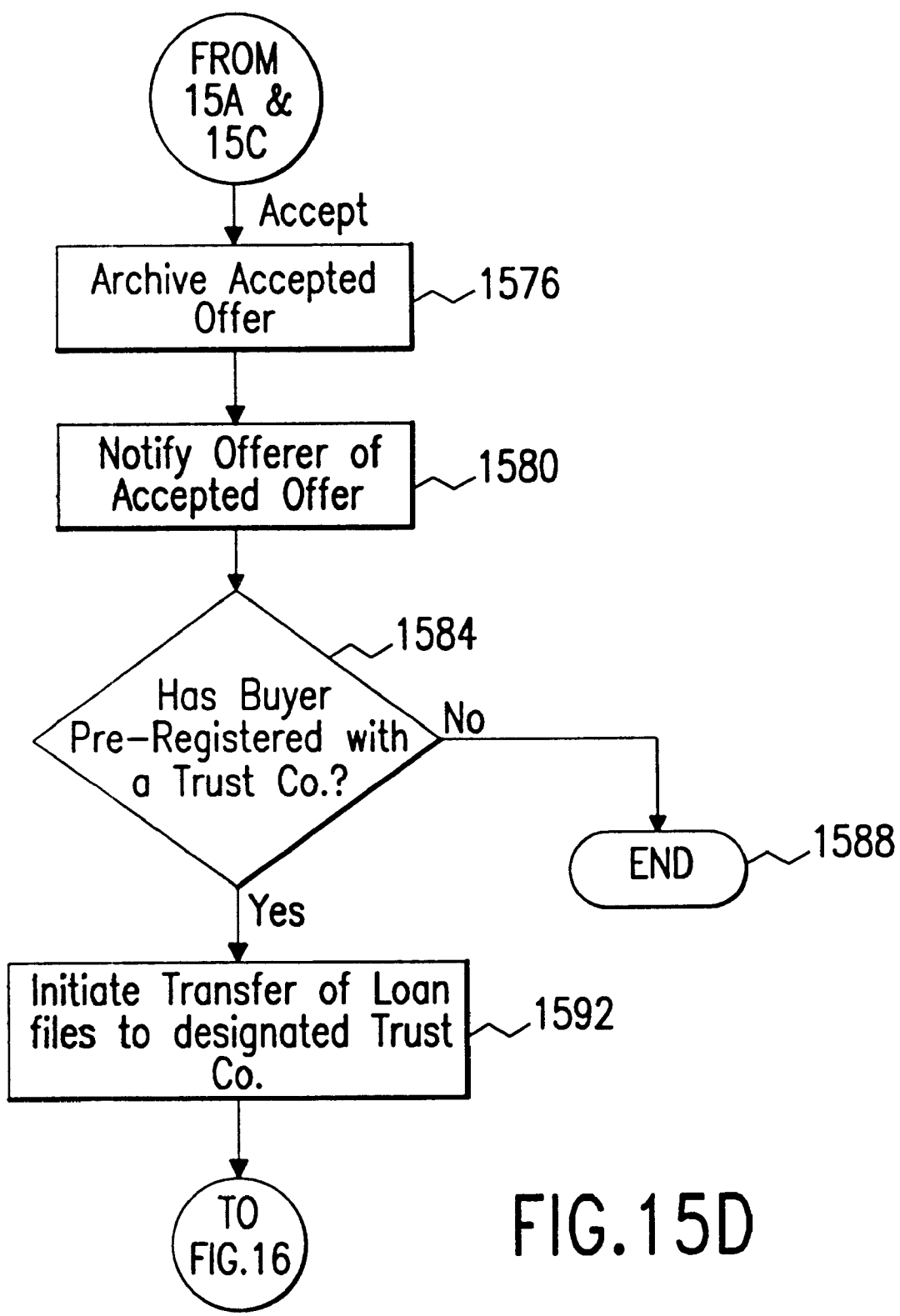

Referring back to steps 1528 and 1556, if the seller accepts the original offer or the buyer accepts the seller's counteroffer, the flow then continues as shown in FIG. 15D. As shown in block 1576, the accepted offer is archived in database 203a of trading subsystem 210. This information is used by exchange system 200 to calculate the market prices for loans. Exchange system 200then notifies the buyer or seller, depending on who made the last offer, of the accepted offer as discussed above and as shown in a step 1580.

In one embodiment, a bid summary is provided, as shown in a GUI 2304 of FIG. 23. This summary includes the original asking price and detail information on the loans in the pool, as shown in a box 2308. Counteroffer information is provided in a box 2312. The status of the bid is displayed in a box 2316. For example, as shown in FIG. 23, the buyer's counteroffer has been accepted. The buyer may then be given the option to withdraw the offer or confirm acceptance.

As shown in FIG. 24, the subscriber may also be provided with a GUI 2404 that summarizes the subscriber's buying and selling activity. GUI 2404 shows an example of the subscriber's buying activity. In a box 2408, the pools on which the subscriber has bid are shown. Information on the pool, including the pool number, date of posting, seller and asking price are displayed. Further, the bid information is shown, including the bid price, buyer's name, number of loans accepted, declined or suspended, and offer date. Finally, the status of the bid is displayed. This provides the subscriber with a summary of the up-to-date status of his trading activity. Further, in abox 2412, the subscriber's past trades can be summarized.

Returning now to FIG. 15D, once terms of a trade are agreed upon, exchange system 200 checks to see if the buyer has pre-registered with a trust company, as shown in a block 1584. When a buyer typically purchases a loan, the sale is contingent upon the buyer conducting a due diligence investigation on the loan file or a statistical sampling of loan files, if a pool of loans is purchased. If the buyer has not pre-registered with a trust company, the flow ends at a step 1588. However, if the buyer is pre-registered, system 200 initiates a transfer of the purchased loan files to the trust company, as shown in a step 1592. The interaction between system 200 and the trust company is discussed in further detail below with reference to FIG. 16.

D. Trust (Due Diligence)

Figure 16:
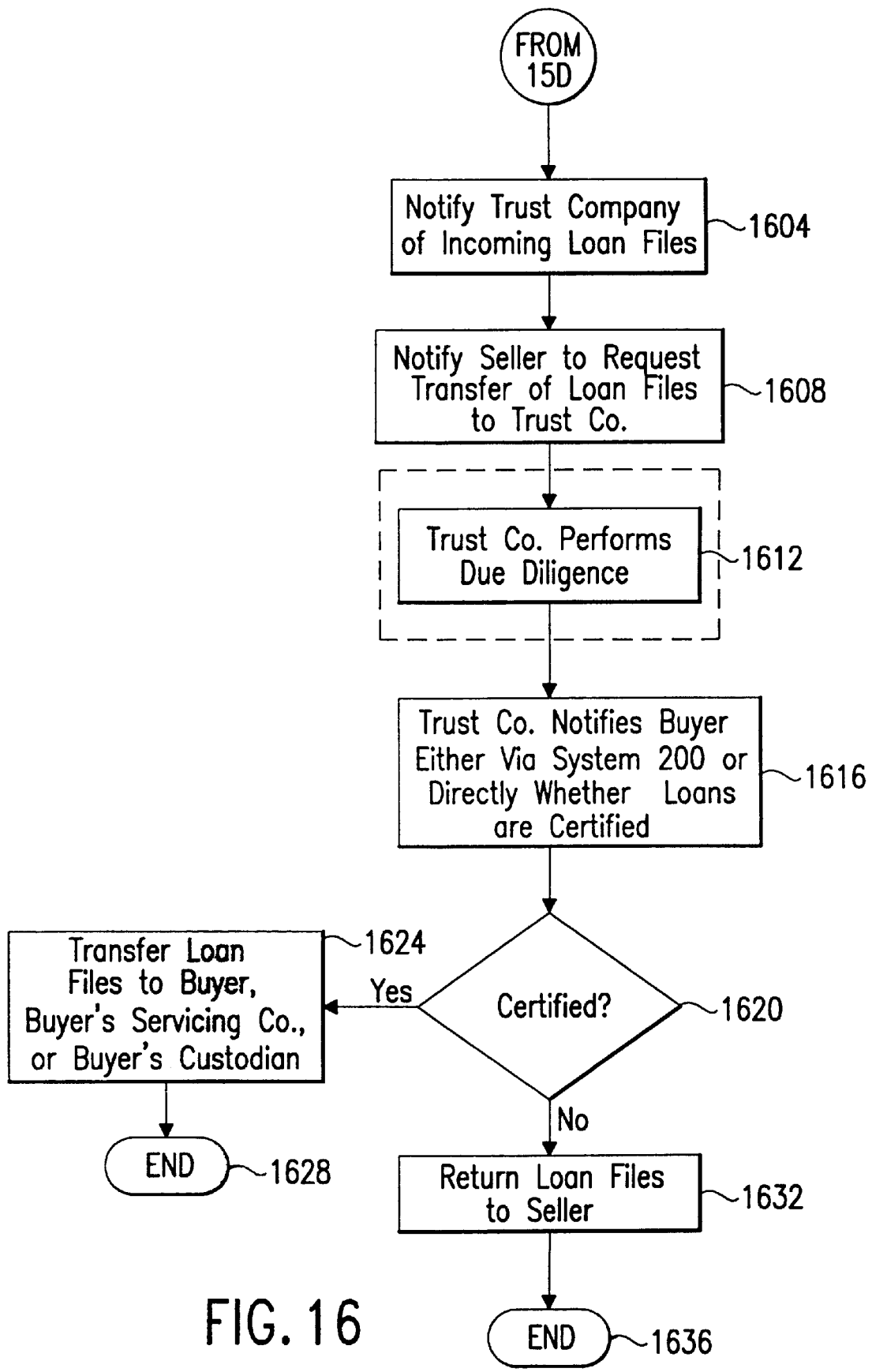
FIG. 16 is a flowchart showing the interaction between the centralized exchange system and a trust company, according to an embodiment of the present invention.
Figure 17:
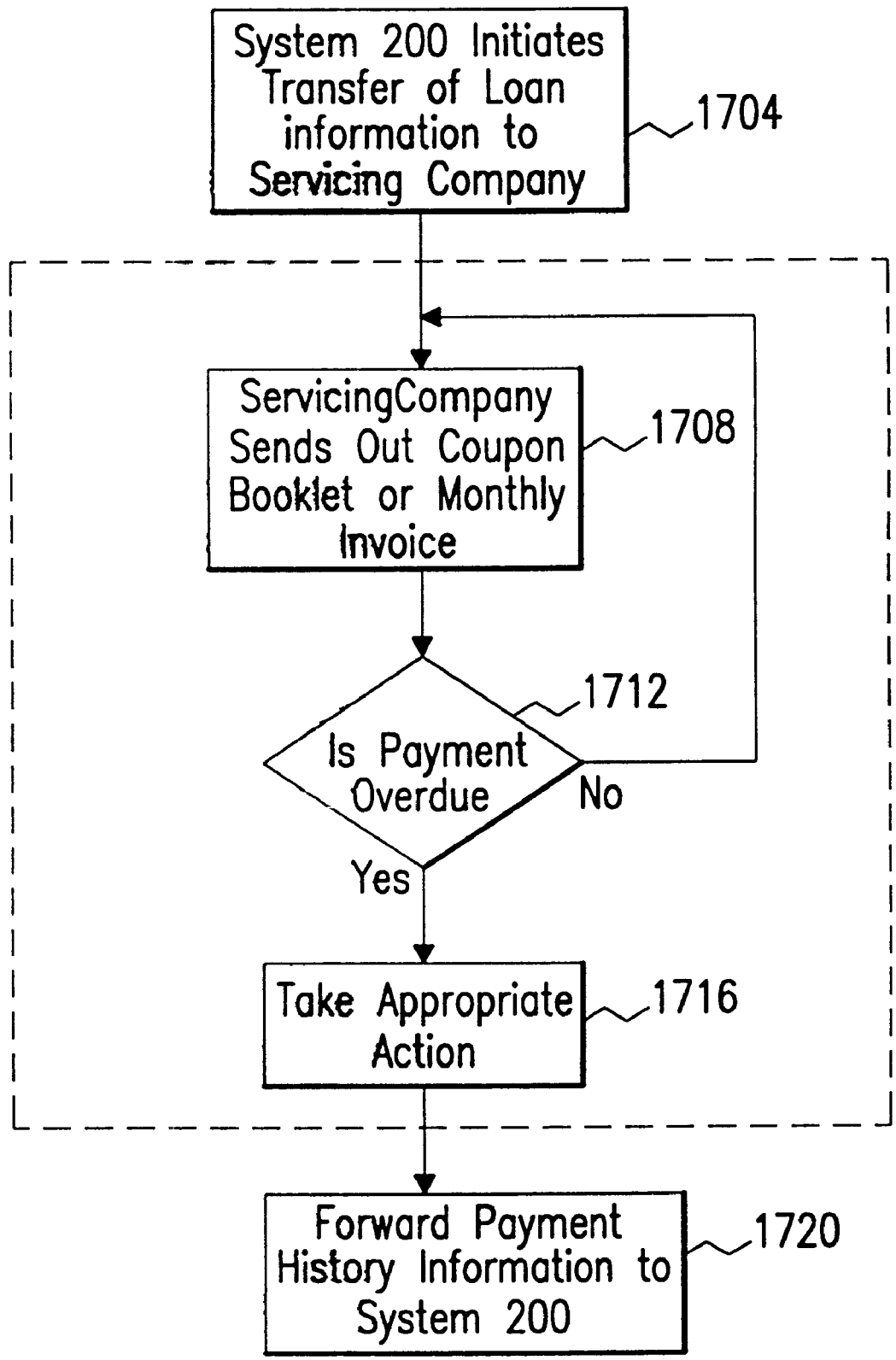
FIG. 17 is a flowchart showing the data flow between the centralized exchange system and a servicing company, according to an embodiment of the present invention.

As shown in FIG. 16, system 200 notifies the trust company of incoming loan files in a step 1604. This notification can occur in several ways. For example, system 200 can notify the trust company via a letter, electronic mail, or other notification methods discussed herein.

System 200 further requests that the seller transfer the loan files directly to the trust company, as shown in a step 1608. As such, the buyer does not have to oversee this file transfer. This notification can be done simply by sending an electronic mail to seller, when the sale is completed, with the name of the trust company.

Then, independent of system 200, the trust company performs its due diligence review of the actual loan file, as shown in a step 1612. The dashed line in FIG. 16 represents that this step is being performed at the trust company site, outside of system 200.

Once the trust company completes its review of the loan files, it notifies this buyer whether the loans were certified, as shown in a step 1616. This notification is sent to system 200 via workstation 280c and may also be communicated directly by the trust company to the buyer.

If the loans are certified, as shown in a decision step 1620, the trust company transfers the loan files to the buyer or directly to the buyer's servicing company, as shown in a step 1624. In one embodiment, system 200 may provide the trust company with notification of where to send the certified loan files via workstation 280c. For example, when the trust company notified system 200 that the loan files were certified in step 1616, system 200 may be programmed to automatically provide information to the trust company on where the loan files are to be sent. After this transfer has occurred, this interaction ends in a step 1628.

If the loans are not certified, the loan files are returned by the trust company to the seller, as shown in a step 1632 and the interaction ends in a step 1636.

E. Servicing

Once a loan or loan pool has been purchased by a buyer having a pre-registered servicing company, system 200 initiates a transfer of loan information to the servicing company via servicing gateway 250, as shown in a step 1704. The servicing company uses this loan information provided by system 200 to send out coupon booklets or monthly invoices, as shown in a step 1708.

The servicing company then monitors the borrowers monthly payments and archives history payment information. For example, the servicing company will store information indicating whether the borrower made a monthly payment on time.

If a payment is overdue, as shown in a decision step 1712, the servicing company decides what action is required, in a step 1716, such as filing a claim in bankruptcy, or filing a claim in court for overdue payments. Often, the servicing company will place several calls to the borrower to resolve any overdue payments before filing claims.

The servicing company can access system 200 via workstation 280h to periodically forward this payment history information back to the system 200 as shown in a step 1720. In particular, the servicing company sends servicing information back to system 200 via servicing gateway 250 to update the system. In one embodiment, this updating occurs nightly, however, it would be apparent to one skilled in the relevant art(s), that such updates could occur more or less frequently, as desired.

Many servicing companies employ mortgage service software such as the Mortgage Servicer Systems software available from Financial Industry Computer Systems (FICS) Group of Brussels, Belgium. The present invention interfaces with such software to facilitate upload and download information from servicing gateway 250 to and from system 200.

F. Securitization

As shown by a block 320 in FIG. 3, the investors can access system 200 via workstation 280e look for loan pools for sale by mortgage bankers to purchase. Using trading subsystem 210, investors can make bids on loan pools for sale on the system 200. The investors then use collections of these purchased loan pools to create mortgage-backed securities, as discussed in detail above. The investors can publish these mortgage-backed securities on system 200 via workstation 280e for sale to interested buyers.

G. Brokerage As explained above, brokerage firms may be employed by the investors to find buyers for the mortgage-backed securities. As shown by a block 324 in FIG. 3, these brokerage firms can access system 200 via workstation 280g to find out risk-return statistical information about the loans in the loan pool, that is being used to back the mortgage-backed security. Further, the brokerage firms can access information from system 200 via the workstation 280h to find out payment history information for the loans in the loan pool.

H. Credit Rating

As shown by a block 336 in FIG. 3, a credit rating agency, typically hired by the brokerage firm to rate a mortgage-backed security, can access system 200 to review the payment history and risk-return information in system 200 in order to rate a particular security. For example, the credit rating agency can review the payment history of the loans used to back a particular mortgage-backed security, to determine whether the loans are likely to be prepaid or go into default.

I. Risk/Return

A risk-retun module, represented by risk-return interface 332 in FIG. 3, is accessed via workstation 280g and is meant to provide the subscriber with quality control and risk analysis data as they use the exchange system 200 in their decision-making processes. In one embodiment, the risk-return module includes, for example, one or more of the following calculations typically known and used by one skilled in the relevant art to make a determination of risk associated with a particular loan or loan pool: prepayment calculations on a loan or loan pool, duration calculations on a loan or loan pool, convexity ($\gamma$ distribution), vega, derivative with respect to total prepayment, housing turnover, refinancing, conditional prepayment rate (CPR), option adjusted spread (OAS), value at risk (VAR), cash flow, total rate of return, price/yield calculations, and scenario builders for cash flow analysis.

In one embodiment, the risk return module further includes an index of trade data from live transactions or trades that occur over the exchange system 200. This trade data may include, for example, volume of trades, weighted average coupon, average combined loan-to-value ratio, average FICO score, average term of loan, average rate and average debt ratio.

The risk return module may also incorporate other data points from externally running subsystems such as, but not limited to, the loan origination subsystem 240 and servicing subsystem 250. The risk-return module is designed to be very flexible in nature. This means that all processes read initialization files (*.ini) upon starting to set parameters. Command line arguments and GUI methods of setting variables during execution are also important functions.

The data contained in the risk-return module is important because it is shared across many different subsystems within exchange system 200. As outlined below, reports and visualizations, such as graphs, of data in the risk return module are provided for the subscribers. Through operation of the system 200 over time, the data in the risk return module allows for predictive modeling. The purpose of the risk return module is to use collect the data over time to build dependence from subscribers on the system 200 so that full trade-based decisions can be made based on the data available to the users in the risk return module, similar to data relied on by individuals involved in transactions on Wall Street today.

Neural-network technology can be used in the risk-return module. The network will train off of real-time trades that are occurring in trading subsystem 210 within the exchange system 200. The data in the risk-return module evolves over operation time of the system 200. Thus, as will be apparent to one skilled in the relevant art(s), necessary measures within the risk-return module must be taken in order to protect and secure the data used within it.

There is also statistical and scientific analyses conducted within the risk-return module. The results of these analyses are presented to the user in the form of graphs and other visualizations of the data. These graphs and other visualizations are more easily used by the subscribers than massive numerical reports. Massive reports can also be provided, however, to illustrate those details of the calculations that may not be readily apparent from the visualizations of the data.

In one embodiment of the present invention, the risk-return module provides a graph similar to a NAV-type graph that is time focused, such that it correlates time with some value that changes over time. In the present invention, this variable is often focused around money (e.g, volume of trades, value of trades, etc.). While time will be on one axis, the other axis will contain sellers or buyers. As such, a subscriber will be able to peruse (at-a-glance) what other companies within the exchange system 200 are doing.

In an embodiment of the present invention, an index of the risk return module includes graphs of the following information: (1) single company number of trades over time; (2) multiple company number of trades over time; (3) volume of trades on the trading system over time; (4) total number of bids and sells over time; and (5) changes in company criteria over time. The preceding listing of graphs is provided by way of example only. It would be apparent to one skilled in the relevant art(s) that graphs depicting the change over time of other types of data may be useful as a predictor of risk.

In one embodiment, access to the risk-return module is provided over a secure public-key cryptosystem web connection (e.g., SSL). As such, the risk return module functions are limited to a service-based environment along with the actual trading platform (i.e., subsystem 210). This configuration allows for quick updates, and immediate updating with new functionalities. This is particularly important to the exchange service provider organization because it may test different prediction algorithms and the like, as they are discovered/developed, and the ability to swap and make new algorithm outputs available to subscribers in short order is needed.

The risk-return module interfaces with the following subsystems (as described in FIGS. 2A and 2B above), each with their own unique data repository: loan origination subsystem 240, trading subsystem 210, portfolio subsystem 220, and boarding relay server 225 conduit. Boarding relay server 225 conduit is a secure transport and relay mechanism that exists at the exchange system 200. The data that is piped through boarding relay server 225 conduit will be archived and usable by analyses processes of the risk return module. In one embodiment, this conduit is based in part on the open extensible Markup Language (XML) specification maintained by the World Wide Web Consortium (W3C), whereby many other potential processes are able to read these files during integration with one of the several (freeware) publicly available XML/DTD parsers.

In one embodiment, the risk-return module collects and presents data on the valuation of the Treasury Bill (T-Bill) from Wall Street. As more trades occur over the system 200, and more subscribers use the system 200, the data in the risk return module becomes an even more valuable predictor of risk.

The present invention also may include a "ticker-tape" visualization of certain data in the risk return module. "Splash" or message screens can be utilized in the beginning of the exchange system 200 operation (i.e., as the data repositories are ramping up). These presentation formats can be used to highlight a certain subset of data points in real-time. Examples of such data include mean trade value, total volume of trades, etc.

The data within the risk-return module will be in a number of file formats, including, for example: flat file (XML), Relational Database Systems (RDBMS), and Object Database Systems (ODBMS). The system utilizes "adapters" to these different data repositories, and reuses them across all data repositories of that type.

VI. Environment

Figure 20:
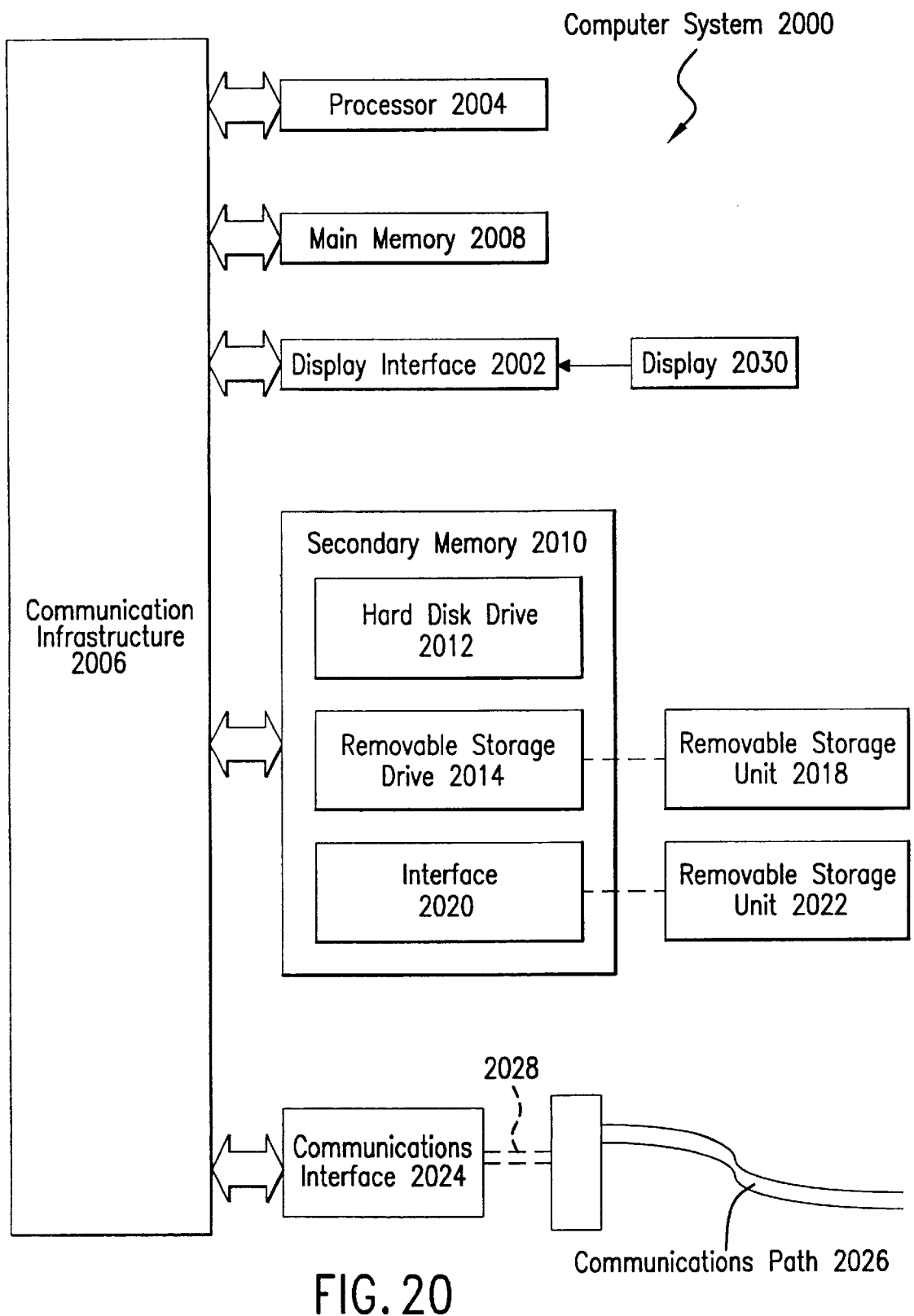
FIG. 20 is a block diagram of an exemplary computer system useful for implementing the present invention.

The present invention (i.e., exchange system 200 or any part thereof) may be implemented using hardware, software or a combination thereof and may be implemented in a computer system or other processing system. In fact, in one embodiment, the invention is directed toward one or more computer systems capable of carrying out the functionality described herein. An example of a computer system 2000 is shown in FIG. 20. The computer system 2000 includes one or more processors, such as processor 2004. The processor 2004 is connected to a communication infrastructure 2006 (e.g, a communications bus, cross-over bar, or network). Various software embodiments are described in terms of this exemplary computer system. After reading this description, it will become apparent to a person skilled in the relevant art(s) how to implement the invention using other computer systems and/or computer architectures.

Computer system 2000 can include a display interface 2005 that forwards graphics, text, and other data from the communication infrastructure 2002 (or from a frame buffer not shown) for display on the display unit 2030.

Computer system 2000 also includes a main memory 2008, preferably random access memory (RAM), and may also include a secondary memory 2010. The secondary memory 2010 may include, for example, a hard disk drive 2012 and/or a removable storage drive 2014, representing a floppy disk drive, a magnetic tape drive, an optical disk drive, etc. The removable storage drive 2014 reads from and/or writes to a removable storage unit 2018 in a well-known manner. Removable storage unit 2018, represents a floppy disk, magnetic tape, optical disk, etc. which is read by and written to by removable storage drive 2014. As will be appreciated, the removable storage unit 2018 includes a computer usable storage medium having stored therein computer software and/or data.

In alternative embodiments, secondary memory 2010 may include other similar means for allowing computer programs or other instructions to be loaded into computer system 2000. Such means may include, for example, a removable storage unit 2022 and an interface 2020. Examples of such may include a program cartridge and cartridge interface (such as that found in video game devices), a removable memory chip (such as an EPROM, or PROM) and associated socket, and other removable storage units 2022 and interfaces 2020 which allow software and data to be transferred from the removable storage unit 2022 to computer system 2000.

Computer system 2000 may also include a communications interface 2024. Communications interface 2024 allows software and data to be transferred between computer system 2000 and external devices. Examples of communications interface 2024 may include a modem, a network interface (such as an Ethernet card), a communications port, a PCMCIA slot and card, etc. Software and data transferred via communications interface 2024 are in the form of signals 2028 which may be electronic, electromagnetic, optical or other signals capable of being received by communications interface 2024. These signals 2028 are provided to communications interface 2024 via a communications path (i.e., channel) 2026. This channel 2026 carries signals 2028 and may be implemented using wire or cable, fiber optics, a phone line, a cellular phone link, an RF link and other communications channels.

In this document, the terms "computer program medium" and "computer usable medium"are used to generally refer to media such as removable storage drive 2014, a hard disk installed in hard disk drive 2012, and signals 2028. These computer program products are means for providing software to computer system 2000. The invention is directed to such computer program products.

Computer programs (also called computer control logic) are stored in main memory 2008 and/or secondary memory 2010. Computer programs may also be received via communications interface 2024. Such computer programs, when executed, enable the computer system 2000 to perform the features of the present invention as discussed herein. In particular, the computer programs, when executed, enable the processor 2004 to perform the features of the present invention. Accordingly, such computer programs represent controllers of the computer system 2000.

In an embodiment where the invention is implemented using software, the software may be stored in a computer program product and loaded into computer system 2000 using removable storage drive 2014, hard drive 2012 or communications interface 2024. The control logic (software), when executed by the processor 2004, causes the processor 2004 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

VIII. Conclusion

While various embodiments of the present invention have been described above, it should be understood that they have been presented by way of example, and not limitation. It will be apparent to persons skilled in the relevant art(s) that various changes in form and detail may be made therein without departing from the spirit and scope of the invention This is especially true in light of technology and terms within the relevant art(s) that may be later developed. Thus the present invention should not be limited by any of the above-described exemplary embodiments, but should be defined only in accordance with the following claims and their equivalents.

What is claimed is:

1. A centralized system for trading financial products in the secondary market, wherein the system is capable of being accessed by a plurality of subscriber, the system comprising:

means for receiving loan information for a plurality of loans in a loan pool from a first subscriber;

means for storing said loan information in a database;

means for receiving selection inputs from a second subscriber for said loans in said loan pool, wherein said selection inputs indicate which of the loans in said loan pool said second subscriber wishes to purchase, whereby said system allows trading of loans in the secondary market and means for allowing said first subscriber to accept said selection inputs entered by said second subscriber, wherein a trade is processed when said selection inputs are accepted.

2. The system of claim 1, wherein said first subscriber is selected from the group consisting of at least one of the following: a borrower, a broker, a mortgage bank correspondent, a servicing company, and a mortgage bank investor.

3. The system of claim 1, further comprising:

means for receiving selection inputs from said first subscriber in order to create said loan pool.

4. The system of claim 3, wherein said means for receiving selection inputs from said first subscriber, comprises:

means for searching said loan information using loan criteria; and means for selecting individual loans to include in said loan pool based on said loan information.

5. The system of claim 1, wherein said means for receiving selection inputs from said second subscriber comprises:

means for accepting, declining or suspending each loan in said loan pool; and means for submitting a bid on those loans in said loan pool that are accepted.

6. The system of claim 5, wherein said means for receiving selection inputs from said second subscriber further comprises:

means for notifying said first subscriber of said bid.

7. The system of claim 5, further comprising:

means for searching said loan information for each loan in said loan pool based on loan criteria.

8. The system of claim 7, wherein said loan criteria is selected from a group consisting of at least one of the following: FICO score, combined loan-to-value ratio, income-to-debt ratio, interest rate, loan amount, term of loan, appraisal value of property, monthly income of borrower, type of loan, points, purchase balance, original balance, and state.

9. The system of claim 1, further comprising:

means for registering at least one rule corresponding to said second subscriber's purchasing criteria.

10. The system of claim 9, further comprising:

means for reviewing said second subscriber's rule(s).

11. The system of claim 9, further comprising:

means for matching said second subscriber's rule(s) to said loan information; and means for notifying said second subscriber when said loan information for one or more of said loans in said loan pool matches said second subscriber's rule(s).

12. The system of claim 11, wherein said notifying means notifies said subscriber by at least one of the following devices: pager, electronic mail, cellular telephone, personal digital assistant, and telephone.

13. The system of claim 1, further comprising:

means for collecting and analyzing trade data to create an index.

14. The system of claim 13, wherein said trade data are selected from the group consisting of at least one of the following: volume of trades, weighted average coupon, average combined loan-to-value ratio, average FICO score, average term of loan, average rate, and average debt ratio.

15. The system of claim 13, wherein said index is used to develop a subscriber's rule(s).

16. The system of claim 1, further comprising:

means for forwarding loan information for a loan to a servicing company to service said loan.

17. The system of claim 1, further comprising:

means for trading in a mortgage-backed security that is backed by at least one loan pool.

18. A method for trading financial products in the secondary market on a network, wherein the network is capable of being accessed by a plurality of subscribers, the method comprising the steps of:

(a) receiving loan information for a plurality of loans in a loan pool from a first subscriber;

(b) storing said loan information in a database;

(c) receiving selection inputs from a second subscriber for said loans in said loan pool, wherein said selection inputs indicate which of the loans in said loan pool said second subscriber wishes to purchase, whereby the method allows trading of loans in the secondary market; and (d) allowing said first subscriber to accept said selection inputs entered by said second subscriber, wherein a trade is processed when said selection inputs are accepted.

19. The method of claim 18, wherein said first subscriber is selected from the group consisting of at least one of the following: a borrower, a broker, a mortgage bank correspondent, a servicing company, and a mortgage bank investor.

20. The method of claim 18, further comprising the step of:

(e) receiving selection inputs from said first subscriber in order to create said loan pool.

21. The method of claim 20, wherein said step (e) comprises:
  (i) searching said loan information using loan criteria; and
  (ii) selecting individual loans to include in said loan pool based on said loan information.

22. The method of claim 18, wherein said step (c) comprises the steps of:
  (i) accepting, declining or suspending each loan in said loan pool; and
  (ii) submitting a bid on those loans in said loan pool that are accepted.

23. The method of claim 22, wherein said step (c) further comprises the step of:
  (iii) notifying said first subscriber of said bid.

24. The method of claim 18, further comprising the step of:
  (e) searching said loan information for each loan in said loan pool based on loan criteria.

25. The method of claim 24, wherein said loan criteria is selected from a group consisting of at least one of the following: FICO score, combined loan-to-value ratio, income-to-debt ratio, interest rate, loan amount, term of loan, appraisal value of property, monthly income of borrower, type of loan, points, purchase balance, original balance, and state.

26. The method of claim 18, further comprising the step of:
  (e) registering at least one rule corresponding to said second subscriber's purchasing criteria.

27. The method of claim 26, further comprising the step of:
  (f) reviewing said second subscriber's rule(s).

28. The method of claim 26, further comprising the steps of:
  (f) matching said second subscriber's rule(s) to said loan information; and
  (g) notifying said second subscriber when said loan information for one or more of said loans in said loan pool matches said second subscriber's rule(s).

29. The method of claim 28, wherein said second subscriber is notified by at least one of the following devices: pager, electronic mail, cellular telephone, personal digital assistant, and telephone.

30. The method of claim 18, further comprising the step of:
  (e) collecting and analyzing trade data to create an index.

31. The method of claim 30, wherein said trade data are selected from the group consisting of at least one of the following: volume of trades, weighted average coupon, average combined loan-to-value ratio, average FICO score, average term of loan, average rate, and average debt ratio.

32. The method of claim 30, wherein said index is used to develop a subscriber's rule(s).

33. The method of claim 18, further comprising the step of:
  (e) forwarding loan information for a loan to a servicing company to service said loan.

34. The method of claim 18, further comprising the step of:
  (e) trading in a mortgage-backed security that is backed by at least one loan pool.

35. A computer program product comprising:
  control logic stored therein for causing a computer to allow trading financial products in the secondary market, wherein a plurality of subscribers use said computer program product, said control logic comprising:
  first computer readable program code means for causing a first computer to receive loan information for a plurality of loans in a loan pool from a first subscriber;
  second computer readable program code means for causing said first computer to store said loan information in a database;
  third computer readable program code means for causing said first computer to receive selection inputs from a second subscriber for said loans in said loan pool, wherein said selection inputs indicate which of the loans in said loan pool said second subscriber wishes to purchase whereby said system lows trading of loans in the secondary market; and
  fourth computer readable program code means for causing said first computer to allow said first subscriber to accept said selection inputs entered by said second subscriber, wherein a trade is processed when said selection inputs are accepted.

36. A program storage device readable by a machine, tangibly embodying a program of instructions executable by the machine to perform method steps of enabling trading of a loan pool in the secondary market, said method steps comprising:
  (a) receiving loan information for a plurality of loans in a loan pool from a first subscriber;
  (b) storing said loan information in a database;
  (c) receiving selection inputs from a second subscriber for said loans in said loan pool, wherein said selection inputs indicate which of the loans in said loan pool said second subscriber wishes to purchase, whereby the method allows trading of loans in the secondary market; and
  (d) allowing said first subscriber to accept said selection inputs entered by said second subscriber, wherein a trade is processed when said selection inputs are accepted.

* * * * *